US011929003B2

(12) United States Patent
Lee

(10) Patent No.: US 11,929,003 B2
(45) Date of Patent: Mar. 12, 2024

(54) DISPLAY DEVICE

(71) Applicant: Samsung Display Co., Ltd., Yongin-Si (KR)

(72) Inventor: Seung Jae Lee, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/844,800

(22) Filed: Jun. 21, 2022

(65) Prior Publication Data

US 2023/0092330 A1 Mar. 23, 2023

(30) Foreign Application Priority Data

Sep. 16, 2021 (KR) ........................ 10-2021-0123615

(51) Int. Cl.
*G09G 3/20* (2006.01)

(52) U.S. Cl.
CPC ... *G09G 3/2003* (2013.01); *G09G 2300/0452* (2013.01); *G09G 2310/0267* (2013.01); *G09G 2310/0275* (2013.01); *G09G 2320/0242* (2013.01); *G09G 2330/028* (2013.01)

(58) Field of Classification Search
CPC ......... G09G 3/2003; G09G 2300/0452; G09G 2310/0267; G09G 2310/0275; G09G 2320/0242; G09G 2330/028
See application file for complete search history.

(56) References Cited

U.S. PATENT DOCUMENTS

| | | | | |
|---|---|---|---|---|
| 7,554,584 | B2 | 6/2009 | Lim | |
| 11,062,637 | B2 | 7/2021 | Jeong et al. | |
| 2018/0247985 | A1* | 8/2018 | Jeon | H10K 59/353 |
| 2019/0189045 | A1* | 6/2019 | Hwang | G09G 3/2003 |
| 2020/0151862 | A1* | 5/2020 | Ha | G06T 7/001 |
| 2020/0365070 | A1* | 11/2020 | Jeong | G09G 3/2003 |

FOREIGN PATENT DOCUMENTS

| | | | | |
|---|---|---|---|---|
| CN | 108182902 A * | 6/2018 | | G09G 3/2003 |
| KR | 10-0994993 | 11/2010 | | |
| KR | 10-2020-0131395 | 11/2020 | | |
| KR | 10-2021-0014719 | 2/2021 | | |

* cited by examiner

*Primary Examiner* — Kenneth Bukowski
(74) *Attorney, Agent, or Firm* — F. Chau & Associates, LLC

(57) ABSTRACT

A display device including: a display panel including first and second display areas; and a panel driver, second reference units in the second display area, each of the second reference units includes n first color light emitting elements and m second color light emitting elements, m is greater than n, the panel driver includes: an image analyzing part determining whether an image displayed in the second display area includes a pattern; and a data processing part rendering n first color image data corresponding to the n first color light emitting elements to generate first color compensation data and rendering m second color image data corresponding to the m second color light emitting elements in first or second rendering operations selected according to whether the image displayed in the second display area includes the first pattern to generate second color compensation data.

18 Claims, 25 Drawing Sheets

DISPLAY DEVICE

This U.S. non-provisional patent application claims priority under 35 U.S.C. § 119 to Korean Patent Application No. 10-2021-0123615, filed on Sep. 16, 2021, the disclosure of which is incorporated by reference herein in its entirety.

1. TECHNICAL FIELD

The present disclosure relates to a display device. More particularly, the present disclosure relates to a display device having an expanded display area.

2. DESCRIPTION OF THE RELATED ART

Various display devices applied to multimedia devices, such as television sets, mobile phones, tablet computers, navigation units, or game units, are being developed. Display devices may include a display area and a non-display area surrounding the display area. The non-display area is also referred to as a peripheral area or a bezel area.

Research is currently being conducted to reduce an area where no image is displayed and to expand an area through which an image is displayed. In other words, research is being conducted to produce display devices with larger display areas and smaller non-display areas.

SUMMARY

The present disclosure provides a display device having an expanded display area by reducing a width of a bezel area.

Embodiments of the present disclosure provide a display device comprising: a display panel comprising a first display area and a second display area adjacent to the first display area; and a panel driver receiving image data and controlling the display panel based on the image data, wherein a plurality of second reference units is disposed in the second display area, each of the second reference units comprises n first color light emitting elements and m second color light emitting elements, each of the n and the m is a natural number equal to or greater than 1, the m is greater than the n, and the panel driver comprises: an image analyzing part determining whether an image displayed in the second display area comprises a first pattern based on the image data; and a data processing part rendering n first color image data corresponding to the n first color light emitting elements to generate first color compensation data and rendering m second color image data corresponding to the m second color light emitting elements in one of first and second rendering operations selected according to whether the image displayed in the second display area comprises the first pattern to generate second color compensation data.

Embodiments of the present disclosure provide a display device comprising: a display panel comprising a first display area and a second display area adjacent to the first display area; and a panel driver receiving image data and controlling the display panel based on the image data, wherein a plurality of reference units is disposed in the second display area, each of the reference units comprises n first color light emitting elements and m second color light emitting elements, each of the n and the m is a natural number equal to or greater than 1, the m is greater than the n, and the panel driver comprises a data processing part rendering n first color image data corresponding to the n first color light emitting elements to generate first color compensation data and rendering m second color image data corresponding to the m second color light emitting elements to generate first sub-compensation data and second sub-compensation data.

According to the above, the reference unit including n first color light emitting elements and m second color light emitting elements is disposed in the second display area of the display device. The number of the second color light emitting elements included in the reference unit is different from the number of the first color light emitting elements included in the reference unit. When an image including a specific pattern is displayed in the second display area, m second color image data corresponding to the m second color light emitting elements are rendered in a second rendering manner different from a first rendering manner. Thus, when the image including the specific pattern is displayed in the second display area, a deterioration in a display quality is prevented.

BRIEF DESCRIPTION OF THE DRAWINGS

The above and other features of the present disclosure will become readily apparent by reference to the following detailed description when considered in conjunction with the accompanying drawings wherein.

DETAILED DESCRIPTION OF THE EMBODIMENTS

Figure 1A:
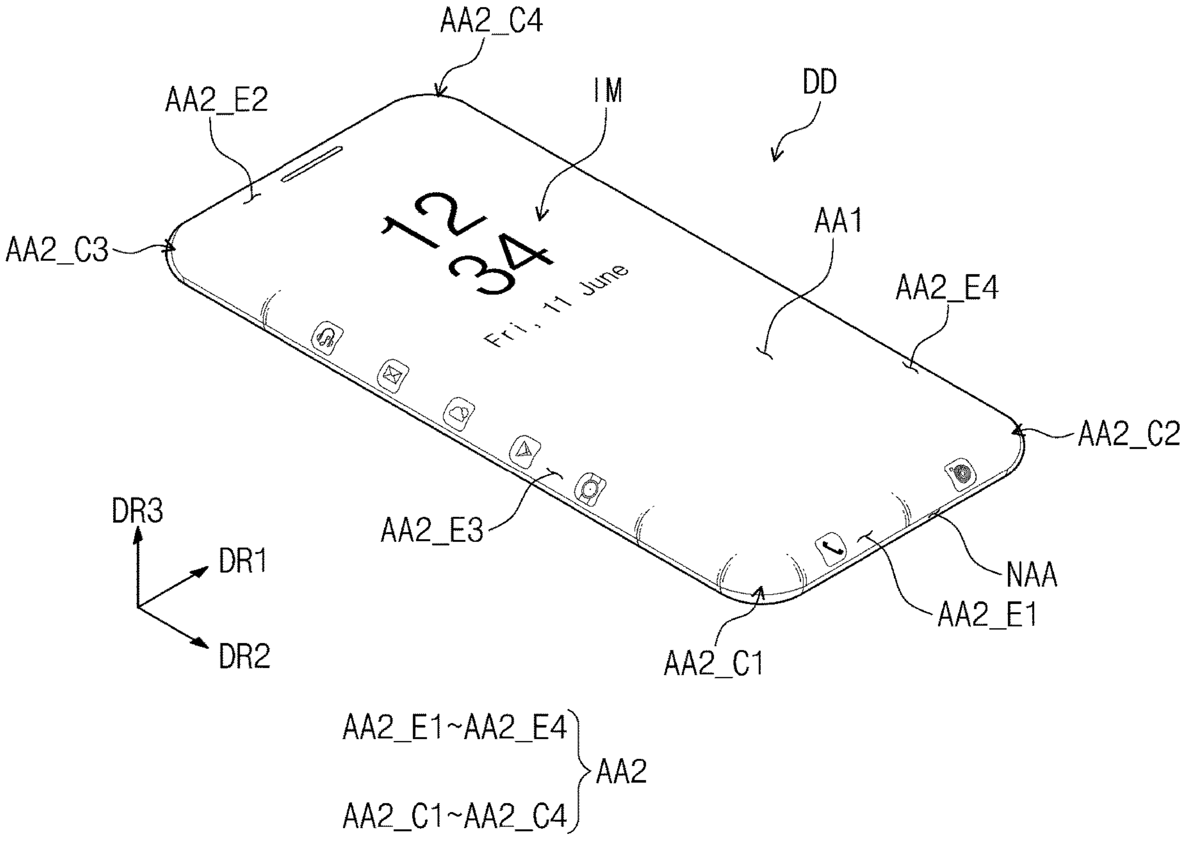
FIG. 1A is a perspective view of a display device according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals may refer to like elements throughout. In the drawings, the thickness, ratio, and dimension of components may be exaggerated for effective description of the technical content. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

Figure 1B:
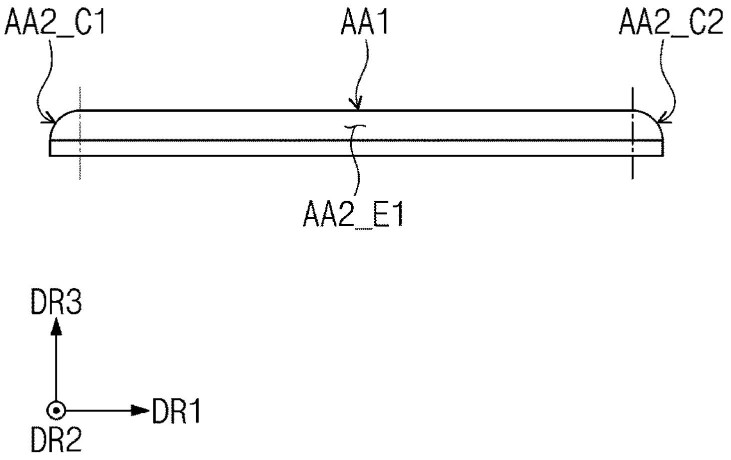
FIG. 1B is a side view of the display device shown in FIG. 1A when viewed in a second direction.
Figure 1C:
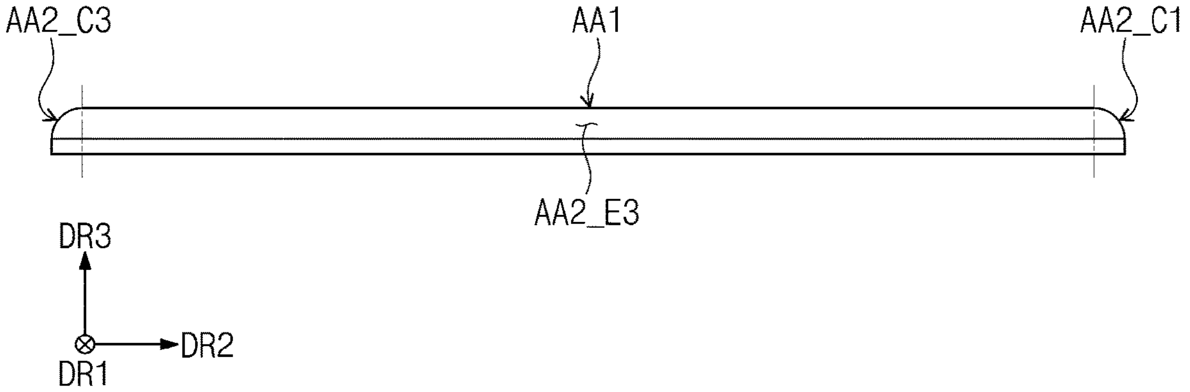
FIG. 1C is a side view of the display device shown in FIG. 1A when viewed toward a first direction.

FIG. 1A is a perspective view of a display device DD according to an embodiment of the present disclosure, FIG. 1B is a side view of the display device DD shown in FIG. 1A when viewed in a second direction DR2, and FIG. 1C is a side view showing the display device DD shown in FIG. 1A when viewed toward a first direction DR1.

FIGS. 1A to 1C show a smartphone as a representative example of the display device DD, however, the display device DD should not be limited to the smartphone. In other words, the display device DD may be applied to a large-sized electronic item, such as a television set, a monitor, or the like, and a small and medium-sized electronic item, such as a mobile phone, a tablet computer, a car navigation unit, a game unit, a smart watch, or the like.

The display device DD may include active areas AA1 and AA2 in which an image IM is displayed and a peripheral area NAA in which the image IM is not displayed. In FIG. 1A, as an example of the image IM, date, time, and icon images are shown.

The active areas AA1 and AA2 may include a first active area AA having a plane shape and a second active area AA2 bent from the first active area AA1. The second active area AA2 may be bent from the first active area AA1 at a predetermined curvature, however, the shape of the second active area AA2 should not be limited thereto or thereby. For example, the second active area AA2 may have a plane shape that is substantially parallel to, inclined to, or perpendicular to the first active area AA1. The first and second active areas AA1 and AA2 are areas classified according to their shape and may be actually implemented in a single display surface. The peripheral area NAA is an area in which the image IM is not displayed. A bezel area may be defined in the display device DD by the peripheral area NAA.

The first active area AA1 may be substantially parallel to a plane defined by the first direction DR1 and the second direction DR2. A normal line direction of the first active area AA1, e.g., a thickness direction of the display device DD, may be substantially parallel to a third direction DR3. Directions indicated by the first, second, and third directions DR1, DR2, and DR3 may be relative to each other and may be changed to other directions.

The second active area AA2 may be an area that is bent and extend from the first active area AA1. The second active area AA2 may include edge active areas AA2_E1, AA2_E2, AA2_E3 and AA2_E4 bent from sides of the first active area AA1 and corner active areas AA2_C1, AA2_C2, AA2_C3 and AA2_C4 bent from corners of the first active area AA1. The second active area AA2 may include a first edge active area AA2_E1 bent from a first side of the first active area AA1, a second edge active area AA2_E2 bent from a second side of the first active area AA1, a third edge active area AA2_E3 bent from a third side of the first active area AA1, and a fourth edge active area AA2_E4 bent from a fourth side of the first active area AA1. The first side of the first active area AA1 may be opposite the second side of the first active area AA1 and the third side of the first active area AA1 may be opposite the fourth side of the first active area AA1. Each of the first to fourth edge active areas AA2_E1 to AA2_E4 may be curved at a predetermined curvature in the third direction DR3. Each of the first to fourth edge active areas AA2_E1 to AA2_E4 may have a single curved surface. In FIG. 1A, the first to fourth edge active areas AA2_E1 to AA2_E4 curved at the same curvature are shown, however, the present disclosure should not be limited thereto or thereby. As an example, the first and second edge active areas AA2_E1 and AA2_E2 may be bent at a curvature different from that of the third and fourth edge active areas AA2_E3 and AA2_E4.

The second active area AA2 may further include a first corner active area AA2_C1 bent from a first corner of the first active area AA1, a second corner active area AA2_C2 bent from a second corner of the first active area AA1, a third corner active area AA2_C3 bent from a third corner of the first active area AA1, and a fourth corner active area AA2_C4 bent from a fourth corner of the first active area AA1. The first and third corners of the first active area AA1 may be opposite each other along the second direction DR2, and the third and fourth corners of the first active area AA1 may be opposite each other along the first direction DRL.

The first corner active area AA2_C1 may be disposed between the first edge active area AA2_E1 and the third edge active area AA2_E3, and the second corner active area AA2_C2 may be disposed between the first edge active area AA2_E1 and the fourth edge active area AA2_E4. The third corner active area AA2_C3 may be disposed between the second edge active area AA2_E2 and the third edge active area AA2_E3, and the fourth corner active area AA2_C4 may be disposed between the second edge active area AA2_E2 and the fourth edge active area AA2_E4.

Each of the first to fourth corner active areas AA2_C1 to AA2_C4 may be bent at a predetermined curvature in the third direction DR3. Each of the first to fourth corner active areas AA2_C1 to AA2_C4 may have a double curved surface.

In the display device DD, the number of the edge active areas AA2_E1 to AA2_E4 and the number of the corner active areas AA2_C1 to AA2_C4 should not be limited thereto or thereby. In other words, the number of the edge active areas AA2_E1 to AA2_E4 and the number of the corner active areas AA2_C1 to AA2_C4, which are included in the second active area AA2, may be changed depending on the shape of the first active area AA1. In addition, at least one of the edge active areas AA2_E1 to AA2_E4 and the corner active areas AA2_C1 to AA2_C4 may be omitted from the display device DD.

According to an embodiment of the present disclosure, a first image displayed through the first active area AA1 and a second image displayed through the second active area AA2 may be dependent on each other. For instance, a picture, a scene in a movie, or a user experience (UX)/user interface (UI) design may be formed by the combination of the first image and the second image. Aesthetics of the display device DD may be improved due to the second active area AA2 curved at the predetermined curvature, and a size of the peripheral area NAA perceived by a user may be reduced.

Figure 2A:
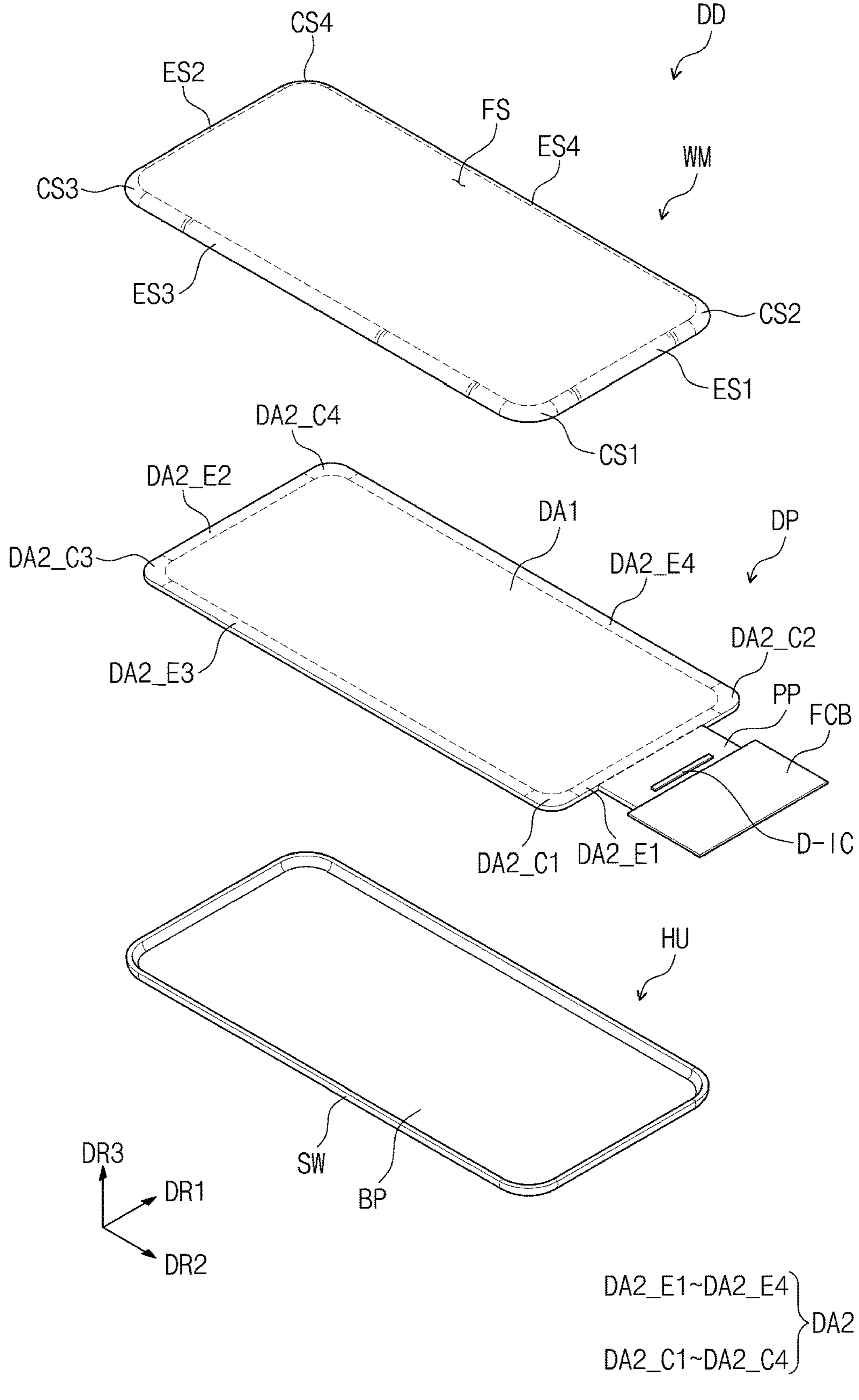
FIG. 2A is an exploded perspective view of a display device according to an embodiment of the present disclosure.
Figure 2B:
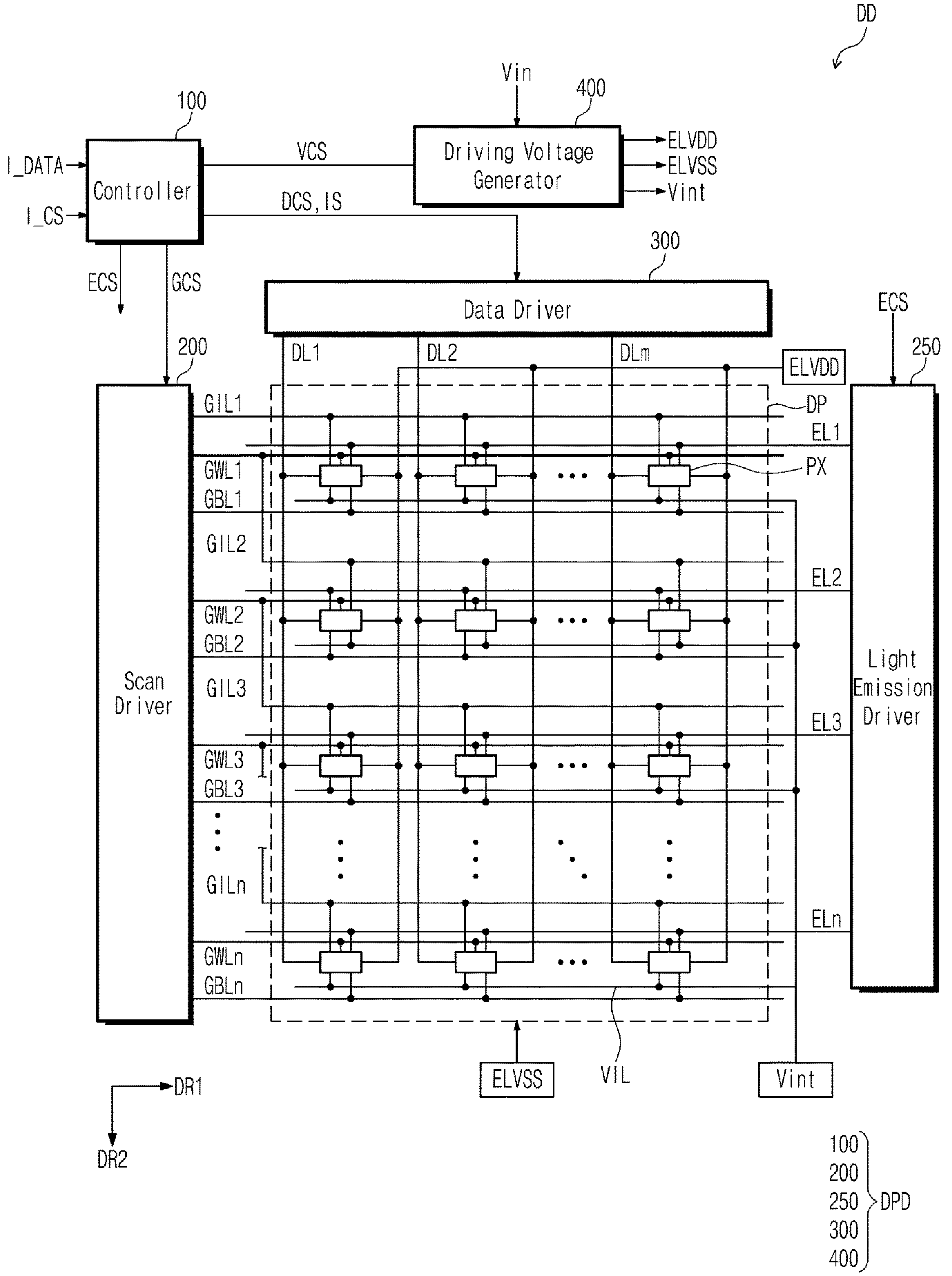
FIG. 2B is a block diagram of a display device according to an embodiment of the present disclosure.
Figure 2C:
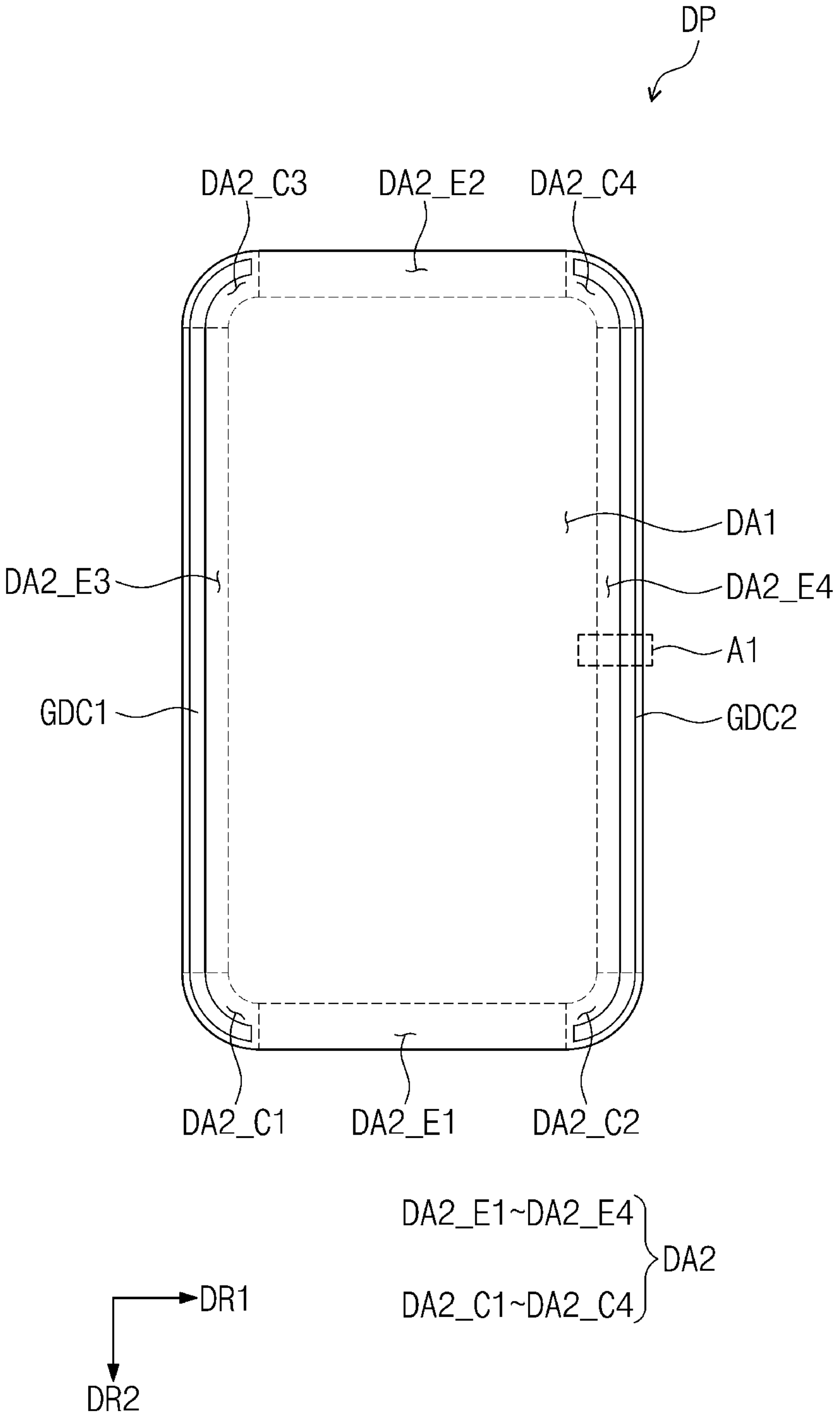
FIGS. 2C and 2D are plan views of a display panel according to some embodiments of the present disclosure.
Figure 2D:
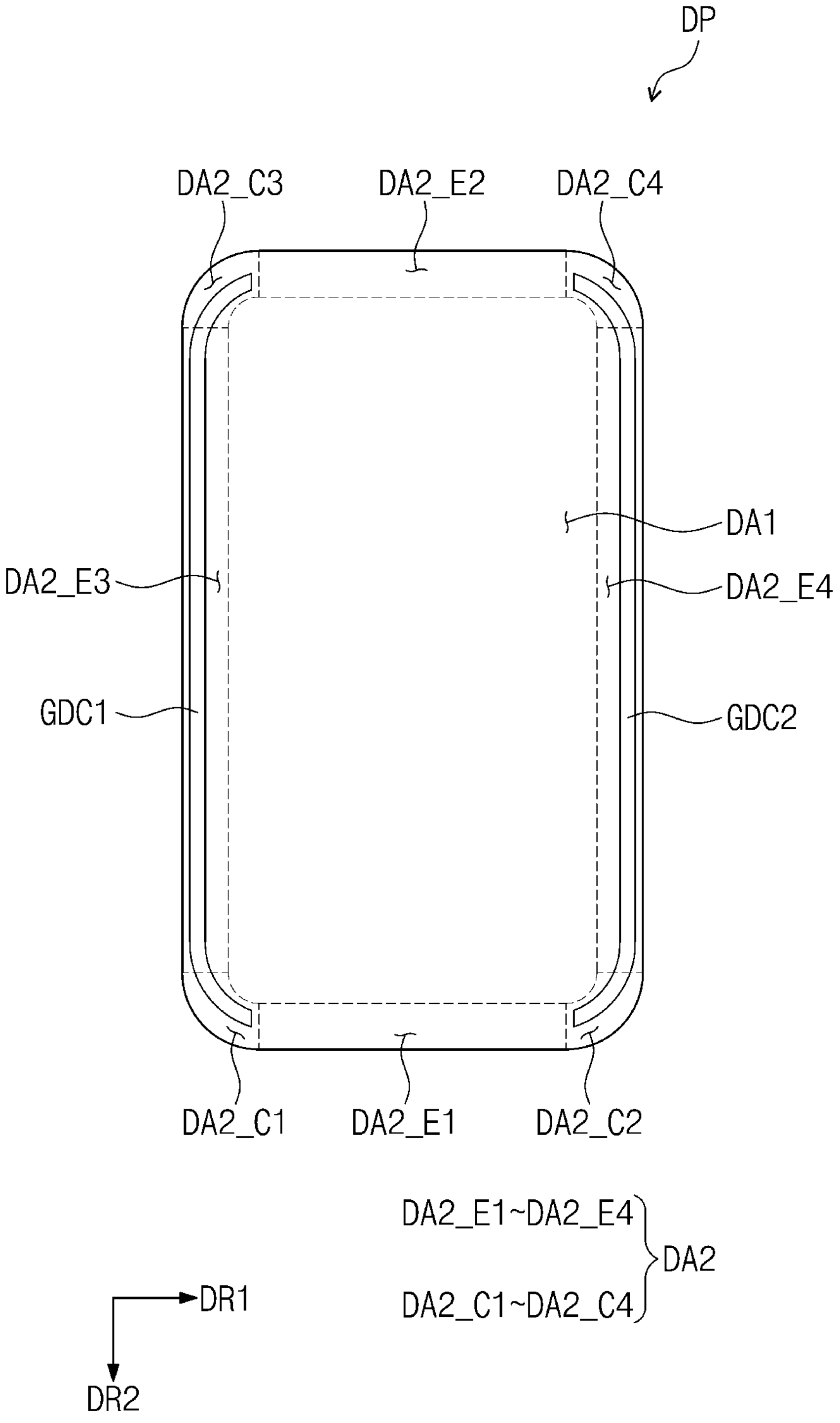

FIG. 2A is an exploded perspective view of the display device DD according to an embodiment of the present disclosure. FIG. 2B is a block diagram of the display device DD according to an embodiment of the present disclosure. FIGS. 2C and 2D are plan views of a display panel DP according to an embodiment of the present disclosure.

Referring to FIG. 2A, the display device DD may include a window WM, a display panel DP, and a housing HU. The window WM may protect an upper surface of the display panel DP. The window WM may be optically transparent. Accordingly, an image displayed through the display panel DP may be perceived by the user through the window WM. In other words, a display surface of the display device DD may be defined by the window WM. The window WM may be implemented by a glass, plastic, or film.

The window WM may have a curved surface structure. The window WM may include a front surface portion FS and one or more curved surface portions bent from the front surface portion FS. In this case, the front surface portion FS and the one or more curved surface portions may be referred to as a transmission portion that transmits an image or a light. The front surface portion FS of the window WM may correspond to the first active area AA1 (refer to FIG. 1A) of the display device DD, and the one or more curved surface portions may correspond to the second active area AA2 (refer to FIG. 1A).

As an example, the window WM may include four curved surface portions, e.g., a first curved surface portion ES1, a second curved surface portion ES2, a third curved surface portion ES3, and a fourth curved surface portion ES4. In the present embodiment, the front surface portion FS may be a plane defined by the first direction DR1 and the second direction DR2. The front surface portion FS may be a plane substantially perpendicular to the third direction DR3. Each of the first to fourth curved surface portions ES1 to ES4 may be bent from the front surface portion FS. For example, each of the first to fourth curved surface portions ES1 to ES4 may be curved downwards from the front surface portion FS. The first and second curved surface portions ES1 and ES2 may be respectively bent from first and second sides of the front surface portion FS. The first and second sides of the front surface portion FS may be substantially parallel to the first direction DR1. The first curved surface portion ES1 and the second curved surface portion ES2 may be disposed parallel to each other in the first direction DR1. The third and fourth curved surface portions ES3 and ES4 may be respectively bent from third and fourth sides of the front surface portion FS. The third and fourth sides of the front surface portion FS may be substantially parallel to the second direction DR2. The third curved surface portion ES3 and the fourth curved surface portion ES4 may be disposed parallel to each other in the second direction DR2.

The first to fourth curved surface portions ES1 to ES4 may be bent from the front surface portion FS at a predetermined curvature. As an example, the first to fourth curved surface portions ES1 to ES4 may have the same curvature as each other. According to an embodiment of the present disclosure, the first and second curved surface portions ES1 and ES2 may have the same curvature as each other, and the third and fourth curved surface portions ES3 and ES4 may have the same curvature as each other. However, the first and second curved surface portions ES1 and ES2 may have a curvature different from that of the third and fourth curved surface portions ES3 and ES4. In addition, the first and second curved surface portions ES1 and ES2 may have a curvature different from each other, and the third and fourth curved surface portions ES3 and ES4 may have a curvature different from each other.

The window WM may further include at least one corner portion. As an example, the window WM may further include four corner portions, e.g., a first corner portion CS1, a second corner portion CS2, a third corner portion CS3, and a fourth corner portion CS4. Each of the first to fourth corner portions CS1 to CS4 may include at least two curvatures. Each of the first to fourth corner portions CS1 to CS4 may have a shape in which curved surfaces having different curvatures from each other are consecutively connected to each other.

The first corner portion CS1 may be disposed between the first curved surface portion ES1 and the third curved surface portion ES3 to connect the first and third curved surface portions ES1 and ES3. The second corner portion CS2 may be disposed between the first curved surface portion ES1 and the fourth curved surface portion ES4 to connect the first curved surface portion ES1 and the fourth curved surface portion ES4. The third corner portion CS3 may be disposed between the second curved surface portion ES2 and the third curved surface portion ES3 to connect the second and third curved surface portions ES2 and ES3. The fourth corner portion CS4 may be disposed between the second curved surface portion ES2 and the fourth curved surface portion ES4 to connect the second and fourth curved surface portions ES2 and ES4. Each of the first to fourth corner portions CS1 to CS4 may be referred to as the transmission portion that transmits the image or light.

Referring to FIGS. 2A and 2C, the display panel DP may include a display area for displaying the image. As an example, the display area may include a first display area DA1 and a second display area DA2. The first display area DA1 may be disposed parallel to the front surface portion FS of the window WM and may have a shape corresponding to the front surface portion FS. In other words, the first display area DA1 may be a flat display area having a flat shape. The second display area DA2 may be disposed to correspond to one or more curved surface portions, e.g., ES1-ES4, and one or more corner portions, e.g., CS1-CS4. The second display area DA2 may have a curved surface shape corresponding to one or more curved surface portions and one or more corner portions. However, the shape of the second display area DA2 should not be limited thereto or thereby, and the second display area DA2 may also have the flat shape.

The second display area DA2 may include first, second, third and fourth edge display areas DA2_E1, DA2_E2, DA2_E3 and DA2_E4 disposed to respectively correspond to the first to fourth curved surface portions ES1 to ES4. The first and second edge display areas DA2_E1 and DA2_E2 may be bent from first and second sides of the first display area DA1 and may be disposed to correspond to the first and second curved surface portions ES1 and ES2 of the window WM, respectively. The first and second sides of the first display area DA1 may extend parallel to the first direction DR1. The first and second edge display areas DA2_E1 and DA2_E2 may be bent from the first display area DA1 at a predetermined curvature.

The third and fourth edge display areas DA2_E3 and DA2_E4 may be bent from third and fourth sides of the first display area DA1 and may be disposed to correspond to the third and fourth curved surface portions ES3 and ES4 of the window WM, respectively. The third and fourth sides of the first display area DA1 may extend parallel to the second direction DR2. The third and fourth edge display areas DA2_E3 and DA2_E4 may be bent from the first display area DA1 at a predetermined curvature.

The structure of the display panel DP in which the second display area DA2 includes the four edge display areas DA2_E1 to DA2_E4 is described with reference to FIG. 2A, however, the structure of the display panel DP according to the present disclosure should not be limited thereto or thereby. In other words, the second display area DA2 of the display panel DP may include only one edge display area or may include only two edge display areas that are provided at the first and second sides of the first display area DA1 or at the third and fourth sides of the first display area DA1.

The second display area DA2 may further include first, second, third and fourth corner display areas DA2_C1, DA2_C2, DA2_C3 and DA2_C4 disposed to correspond to the first to fourth corner portions CS1 to CS4 of the window WM, respectively. The first corner display area DA2_C1 may be disposed between the first and third edge display areas DA2_E1 and DA2_E3, and the second corner display area DA2_C2 may be disposed between the first and fourth edge display areas DA2_E1 and DA2_E4. In addition, the third corner display area DA2_C3 may be disposed between the second and third edge display areas DA2_E2 and DA2_E3, and the fourth corner display area DA2_C4 may be disposed between the second and fourth edge display areas DA2_E2 and DA2_E4. The first to fourth corner display areas DA2_C1 to DA2_C4 may be areas in which the image is displayed, however, the present disclosure should not be limited thereto or thereby. In other words, as an example, the first to fourth corner display areas DA2_C1 to DA2_C4 may be areas in which no image is displayed, or only a portion of the first to fourth corner display areas DA2_C1 to DA2_C4 may display the image.

The display panel DP according to an embodiment of the present disclosure may be a light-emitting type display panel, however, it should not be particularly limited. For instance, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot and a quantum rod. Hereinafter, the organic light emitting display panel will be described as a representative example of the display panel DP.

The display panel DP may be a flexible display panel. Accordingly, the display panel DP may be entirely rolled or may be folded or unfolded about a folding axis.

The display device DD may further include an input sensing layer to sense an external input, e.g., a touch event. The input sensing layer may be disposed directly on the display panel DP. According to an embodiment of the present disclosure, the input sensing layer may be formed on the display panel DP through successive processes. In other words, when the input sensing layer is disposed directly on the display panel DP, an adhesive film may not be disposed between the input sensing layer and the display panel DP, however, the present disclosure should not be limited thereto or thereby. As an example, an adhesive film may be disposed between the input sensing layer and the display panel DP. In this case, the input sensing layer may not be manufactured together with the display panel DP through the successive processes. In other words, the input sensing layer may be fixed to the upper surface of the display panel DP by the adhesive film after being manufactured through a separate process.

Referring to FIG. 2B, the display device DD may further include a panel driver DPD to drive the display panel DP. As an example, the panel driver DPD may include a controller 100, a scan driver 200, a light emission driver 250, a data driver 300, and a driving voltage generator 400.

The controller 100 may receive image data I_DATA and an input control signal I_CS and may convert a data format of the image data I_DATA to a data format appropriate to an interface between the controller 100 and the data driver 300 to generate an image signal IS. The controller 100 may convert the input control signal I_CS into various control signals DCS, GCS, and VCS and may output the control signals DCS, GCS, and VCS.

The scan driver 200 may receive a scan control signal GCS from the controller 100. The scan control signal GCS may include a vertical start signal that starts an operation of the scan driver 200 and a clock signal that determines an output timing of signals. The scan driver 200 may generate a plurality of scan signals and may sequentially output the scan signals to a plurality of scan lines GIL1 to GILn, GWL1 to GWLn, and GBL1 to GBLn, which will be described later.

The light emission driver 250 may receive an emission driving signal ECS from the controller 100. The light emission driver 250 may generate a plurality of emission control signals in response to the emission driving signal ECS and may output the emission control signals to a plurality of emission control lines EL1 to ELn, which will be described later.

In FIG. 2B, the scan driver 200 and the light emission driver 250 may be provided to the display device DD as independent components, however, the present disclosure should not be limited thereto or thereby. As an example, the scan driver 200 and light emission driver 250 may be provided to the display device DD in one integrated configuration. In other words, the scan driver 200 and light emission driver 250 may be provided in a single integrated circuit.

The data driver 300 may receive a data control signal DCS and the image signal IS from the controller 100. The data driver 300 may convert the image signal IS to a data signal and may output the data signal to a plurality of data lines DL1 to DLm described later. The data signal may be an analog voltage corresponding to a grayscale value of the image signal IS.

The driving voltage generator 400 may receive a source voltage Vin from a power supply. The driving voltage generator 400 may convert the source voltage Vin to generate a first driving voltage ELVDD and a second driving voltage ELVSS having a voltage level different from that of the first driving voltage ELVDD. The driving voltage generator 400 may include a direct current (DC)-DC converter. The driving voltage generator 400 may include a boosting converter that boosts the source voltage Vin and generates the first driving voltage ELVDD. In addition, the driving voltage generator 400 may include a buck converter that steps down the source voltage Vin and generates the second driving voltage ELVSS. The driving voltage generator 400 may receive a driving voltage control signal VCS from the controller 100. The driving voltage generator 400 may generate the first and second driving voltages ELVDD and ELVSS in response to the driving voltage control signal VCS.

The driving voltage generator 400 may further generate an initialization voltage Vint. The initialization voltage Vint may have a voltage level different from those of the first and second driving voltages ELVDD and ELVSS.

The display panel DP may include the scan lines GIL1 to GILn, GWL1 to GWLn, and GBL1 to GBLn, the emission control lines EL1 to ELn, the data lines DL1 to DLm, and pixels PX. The scan lines GIL1 to GILn, GWL1 to GWLn, and GBL1 to GBLn may extend in the first direction DR1 and may be arranged in the second direction DR2 perpendicular to the first direction DR1. Each of the emission control lines EL1 to ELn may be arranged parallel to a corresponding scan line among the scan lines GIL1 to GILn, GWL1 to GWLn, and GBL1 to GBLn. The data lines DL1 to DLm may be insulated from the scan lines GIL1 to GILn, GWL1 to GWLn, and GBL1 to GBLn while crossing the scan lines GIL1 to GILn, GWL1 to GWLn, and GBL1 to GBLn.

Each of the pixels PX may be connected to corresponding scan lines among the scan lines GIL1 to GILn, GWL1 to GWLn, and GBL1 to GBLn, a corresponding emission control line among the emission control lines EL1 to ELn, and corresponding data lines among the data lines DL1 to DLm. FIG. 2B shows a structure in which each of the pixels PX is connected to three scan lines among the scan lines GIL1 to GILn, GWL1 to GWLn, and GBL1 to GBLn, however, the present disclosure should not be limited thereto or thereby. For example, each pixel PX may be connected to two scan lines among the scan lines GIL1 to GILn, GWL1 to GWLn, and GBL1 to GBLn.

The display panel DP may receive the first driving voltage ELVDD and the second driving voltage ELVSS. The first driving voltage ELVDD may be applied to the pixels PX via a first power line. The second driving voltage ELVSS may be applied to the pixels PX via electrodes formed in the display panel DP or a second power line. The display panel DP may receive the initialization voltage Vint. The initialization voltage Vint may be applied to the pixels PX via an initialization voltage line VIL.

Referring to FIGS. 2B, 2C, and 2D, the scan driver 200 may include a first scan driver GDC1 and a second scan driver GDC2. Each of the first and second scan drivers GDC1 and GDC2 may generate the scan signals and the emission control signals and may output the generated signals to corresponding pixels PX. The first and second scan drivers GDC1 and GDC2 may be built in the display panel DP. In other words, the first and second scan drivers GDC1 and GDC2 may be directly formed in the display panel DP through a thin film process of forming the pixels PX in the display panel DP.

The display panel DP may further include a non-display area around the second display area DA2. The non-display area may be an area in which the image is not displayed. The non-display area may surround the second display area DA2.

Each of the first and second scan drivers GDC1 and GDC2 may be disposed in the second display area DA2 or may be disposed to partially overlap the second display area DA2. Since each of the first and second scan drivers GDC1 and GDC2 may be disposed in the second display area DA2, an increase in width of the non-display area due to the first and second scan drivers GDC1 and GDC2 may be prevented. Consequently, the size of the non-display area, which is perceived by the user, in the display device DD may be reduced by the second display area DA2.

In FIG. 2C, the first scan driver GDC1 may be disposed adjacent to an outer side of the third edge display area DA2_E3, and the second scan driver GDC2 may be disposed adjacent to an outer side of the fourth edge display area DA2_E4. In addition, the first scan driver GDC1 may be disposed adjacent to outer sides of the first and third corner display areas DA2_C1 and DA2_C3, and the second scan driver GDC2 may be disposed adjacent to outer sides of the second and fourth corner display areas DA2_C2 and DA2_C4. However, locations of the first and second scan drivers GDC1 and GDC2 should not be limited thereto or thereby.

As shown in FIG. 2D, the first scan driver GDC1 may be disposed adjacent to a boundary between the first display area DA1 and the first corner area DA2_C1 in the first corner area DA2_C1 and adjacent to a boundary between the first display area DA1 and the third corner area DA2_C3 in the third corner area DA2_C3. In other words, end portions of the first scan driver GDC1 in FIG. 2D may be located closer to the first display area DA1 than in FIG. 2C. The second scan driver GDC2 may be disposed adjacent to a boundary between the first display area DA1 and the second corner area DA2_C2 in the second corner area DA2_C2 and adjacent to a boundary between the first display area DA1 and the fourth corner area DA2_C4 in the fourth corner area DA2_C4. In other words, end portions of the second scan driver GDC2 in FIG. 2D may be located closer to the first display area DA1 than in FIG. 2C. In the first to fourth corner display areas DA2_C1 to DA2_C4, a bending stress may increase as it gets closer to the outside with respect to the first display area DA1. When the first and second scan drivers GDC1 and GDC2 are disposed adjacent to the outer side in the first to fourth corner display areas DA2_C1 to DA2_C4, the bending stress may affect an operation of the first and second scan drivers GDC1 and GDC2. Accordingly, since the first and second scan drivers GDC1 and GDC2 are disposed adjacent to the first display area DA1 in the first to fourth corner display areas DA2_C1 to DA2_C4, as shown in FIG. 2D, a deterioration in reliability of the first and second scan drivers GDC1 and GDC2, which is caused by the bending stress, may be prevented.

In an embodiment of the present disclosure, a first image displayed in the first display area DA1 and a second image displayed in the second display area DA2 may be dependent on each other. As an example, a picture, a scene in a movie, or a UX/UI design may be formed by the combination of the first image and the second image, however, the present disclosure should not be limited thereto or thereby. For example, a portion of the second display area DA2, e.g., the first to fourth corner display areas DA2_C1 to DA2_C4, may display a black image or an image having a certain pattern, which is not dependent on the first image.

As an example, the display panel DP may be an organic light emitting display panel, an electrophoretic display panel, or an electrowetting display panel. In addition, the display panel DP may be a flexible display panel that is bent along a shape of the window WM.

Referring to FIG. 2A again, the display panel DP may further include a pad area PP extending from the second display area DA2. A driving chip D-IC and pads may be disposed in the pad area PP of the display panel DP. The driving chip D-IC may include the data driver 300 (refer to FIG. 2B). The driving chip D-IC in which the data driver 300 is built may apply the data signal to the first and second display areas DA1 and DA2 of the display panel DP. The driving chip D-IC may further include the driving voltage generator 400 (refer to FIG. 2B). In this case, the driving chip D-IC may supply the first and second driving voltages ELVDD and ELVSS and the initialization voltage Vint to the first and second display areas DA1 and DA2.

As an example, the driving chip D-IC may be mounted on the display panel DP. The display panel DP may be electrically connected to a flexible circuit film FCB via the pads. According to an embodiment of the present disclosure, the driving chip D-IC may be mounted on the flexible circuit film FCB.

The housing HU may include a bottom portion BP and a sidewall SW. The sidewall SW may extend from the bottom portion BP. The display panel DP may be accommodated in an accommodating space defined by the bottom portion BP and the sidewall SW in the housing HU. The window WM may be coupled to the sidewall SW of the housing HU. The sidewall SW of the housing HU may support an edge of the window WM.

The housing HU may include a material having a relatively high strength. As an example, the housing HU may include a glass, plastic, or metal material or a plurality of frames and/or plates formed by a combination of the glass, plastic, and metal materials. The housing HU may stably protect components of the display device DD accommodated therein from external impacts.

Figure 3A:
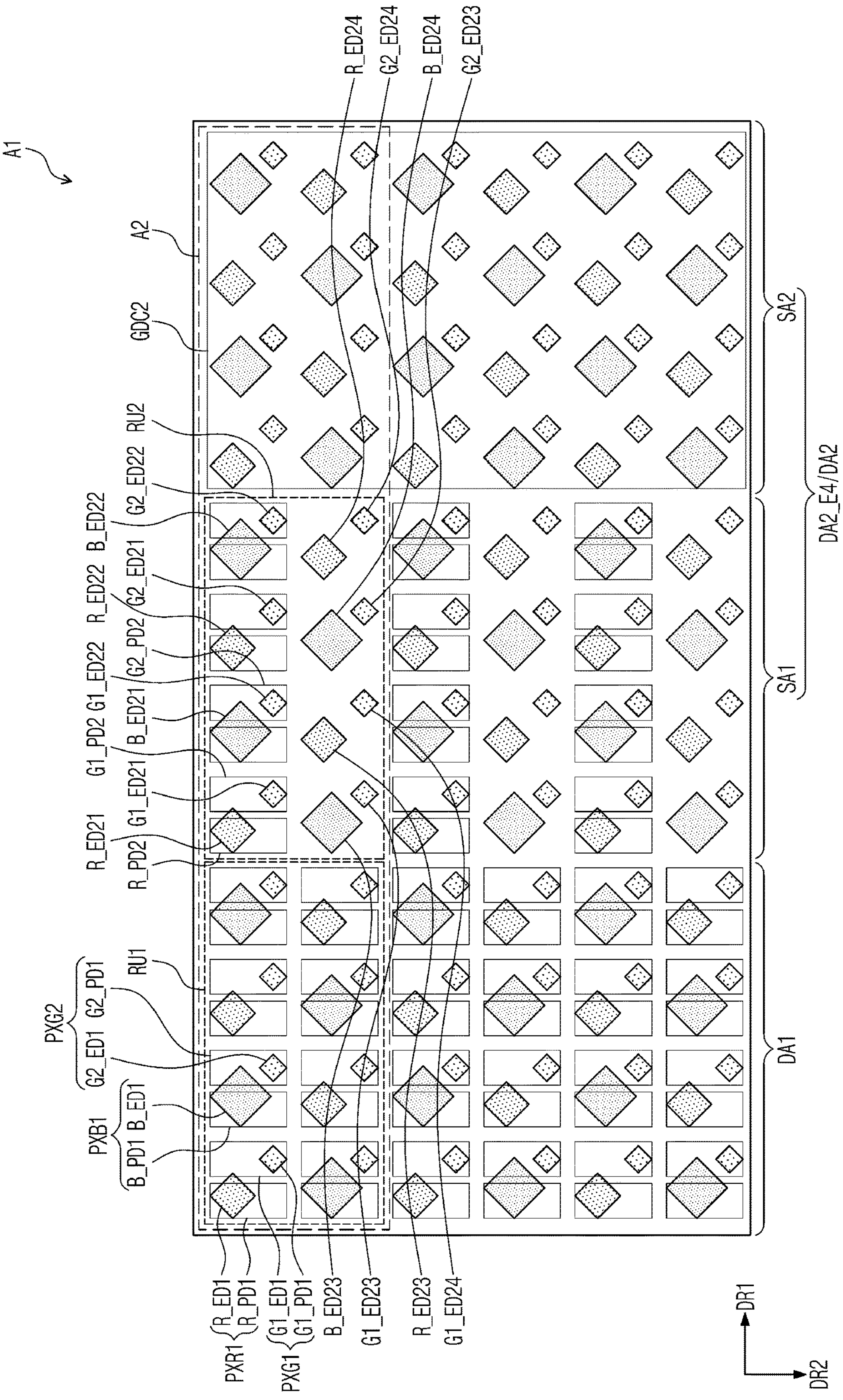
FIG. 3A is an enlarged plan view of an area shown in FIG. 2C according to an embodiment of the present disclosure.
Figure 3B:
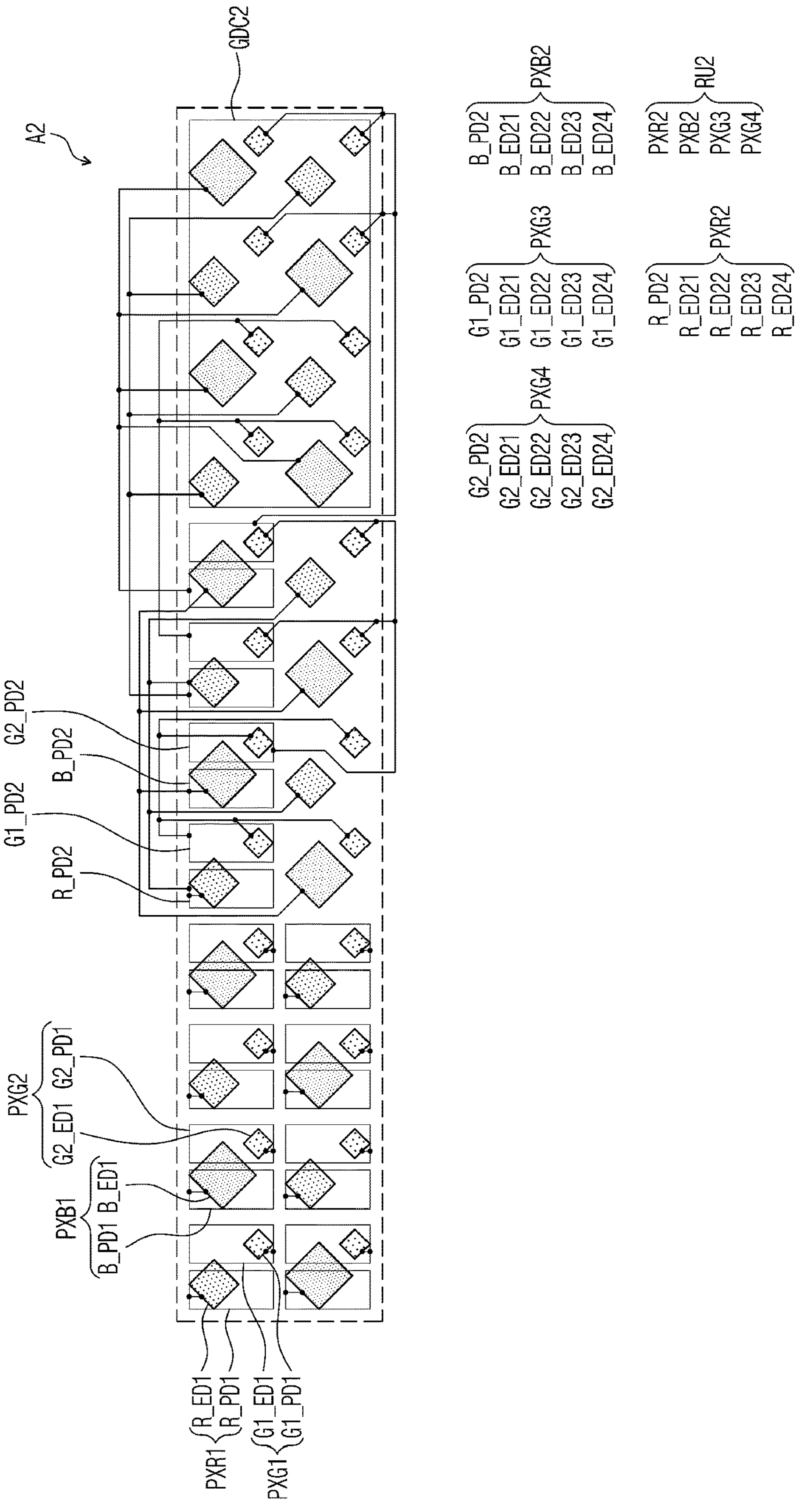
FIG. 3B is a view of a connection relation between light emitting elements and driving circuits of an area shown in FIG. 3A.
Figure 3C:
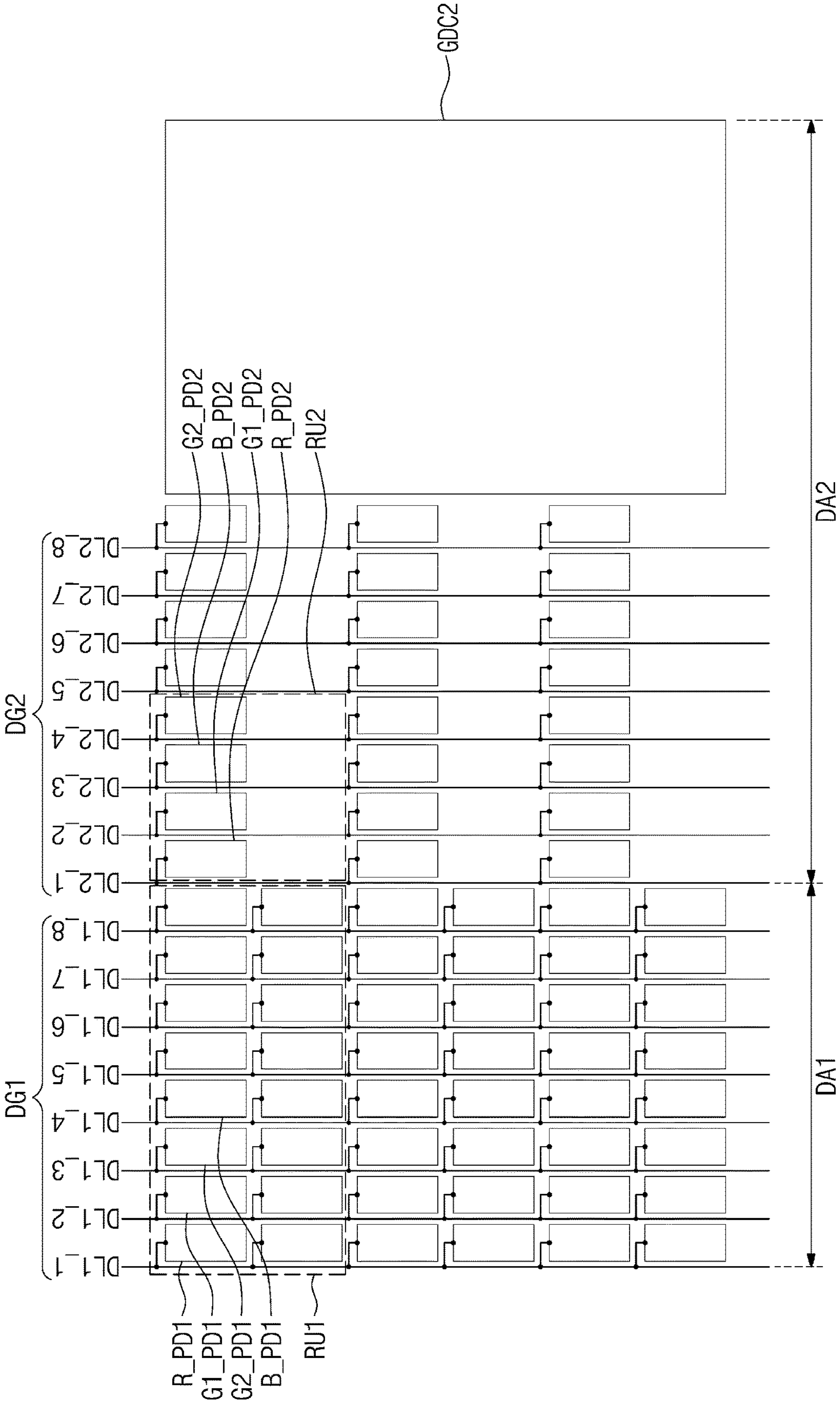
FIG. 3C is a view of a connection relation between driving circuits shown in FIG. 3A and data lines.

FIG. 3A is an enlarged plan view of an area A1 shown in FIG. 2C according to an embodiment of the present disclosure, and FIG. 3B is a view of a connection relation between light emitting elements and driving circuits of an area A2 shown in FIG. 3A. FIG. 3C is a view of a connection relation between driving circuits shown in FIG. 3A and data lines.

Referring to FIGS. 3A and 3B, a plurality of first reference units RU1 may be repeatedly arranged in the first and second directions DR1 and DR2 in the first display area DA1 of the display panel DP. Each of the first reference units RU1 may include a plurality of pixels. As an example, each of the first reference units RU1 may include p red pixels, q green pixels, and p blue pixels. In this case, each of p and q may be a natural number equal to or greater than 1, and q may be greater than p.

For the convenience of explanation, a red pixel included in each of the first reference units RU1 will be referred to as a first red pixel PXR1, and a blue pixel included in each of the first reference units RU1 will be referred to as a first blue pixel PXB1. In addition, a green pixel adjacent to the first red pixel PXR1 among green pixels included in each of the first reference units RU1 will be referred to as a first green pixel PXG1, and a green pixel adjacent to the first blue pixel PXB1 among the green pixels included in each of the first reference units RU1 will be referred to as a second green pixel PXG2. As an example, q is equal to 2p.

As shown in FIGS. 3A and 3B, each of the first reference units RU1 may include four first red pixels PXR1, four first blue pixels PXB1, four first green pixels PXG1, and four second green pixels PXG2. However, the number of the pixels included in the first reference units RU1 should not be particularly limited.

The first red pixel PXR1 may include a first red driving circuit R_PD1 and a first red light emitting element R_ED1. The first red driving circuit R_PD1 may be electrically connected to a corresponding first red light emitting element R_ED1 to control a drive of the first red light emitting element R_ED1. The first green pixel PXG1 may include a first green driving circuit G1_PD1 and a first green light emitting element G1_ED1. The first green driving circuit G1_PD1 may be electrically connected to a corresponding first green light emitting element G1_ED1 to control a drive of the first green light emitting element G1_ED1. The second green pixel PXG2 may include a second green driving circuit G2_PD1 and a second green light emitting element G2_ED1. The second green driving circuit G2_PD1 may be electrically connected to a corresponding second green light emitting element G2_ED1 to control a drive of the second green light emitting element G2_ED1. The first blue pixel PXB1 may include a first blue driving circuit B_PD1 and a first blue light emitting element B_ED1. The first blue driving circuit B_PD1 may be electrically connected to a corresponding first blue light emitting element B_ED1 to control a drive of the first blue light emitting element B_ED1. The first red light emitting element R_ED1 may emit a red light, the first and second green light emitting elements G1_ED1 and G2_ED2 may emit a green light, and the first blue light emitting element B_ED1 may emit a blue light.

The first red driving circuit R_PD1 may overlap the first red light emitting element R_ED1 electrically connected thereto, and the first blue driving circuit B_PD1 may overlap the first blue light emitting element B_ED1 electrically connected thereto. The first green driving circuit G1_PD1 may overlap the first green light emitting element G1_ED1 electrically connected thereto, and the second green driving circuit G2_PD1 may overlap the second green light emitting element G2_ED1 electrically connected thereto.

The fourth edge display area DA2_E4 of the second display area DA2 may include first and second sub-areas SA1 and SA2. FIGS. 3A to 3C show only the fourth edge display area DA2_E4 of the second display area DA2, however, at least one of the first to third edge display areas DA2_E1 to DA2_E3 and the first to fourth corner display areas DA2_C1 to DA2_C4 of the second display area DA2 may have a structure similar to that of the fourth edge display area DA2_E4. Accordingly, the fourth edge display area DA2_E4 will be described with reference to FIGS. 3A to 3C, and descriptions of the other areas of the second display area DA2 will be omitted. However, in the following descriptions with reference to FIGS. 3A to 3C, for the convenience of explanation, the fourth edge display area DA2_E4 will be referred to as the second display area DA2 that is an umbrella term.

A plurality of second reference units RU2 may be repeatedly disposed in the first and second directions DR1 and DR2 in the second display area DA2 of the display panel DP. Each of the second reference units RU2 may include a second red pixel PXR2, a third green pixels PXG3, a fourth green pixels PXG4, and a second blue pixel PXB2. Each of the second reference units RU2 may include n second red light emitting elements R_ED21, R_ED22, R_ED23, and R_ED24, m green light emitting elements G1_ED21, G1_ED22, G1_ED23, G1_ED24, G2_ED21, G2_ED22, G2_ED23, and G2_ED24, and n second blue light emitting elements B_ED21, B_ED22, B_ED23, and B_ED24. In this case, each of n and m may be a natural number equal to or greater than 1, and m may be greater than n. As an example, m may be 2n.

The n second red light emitting elements R_ED21, R_ED22, R_ED23, and R_ED24 may be included in the second red pixel PXR2, and the n second blue light emitting elements B_ED21, B_ED22, B_ED23, and B_ED24 may be included in the second blue pixel PXB2. Some of the m green light emitting elements, for example, k green light emitting elements (hereinafter, referred to as third green light emitting elements G1_ED21 to G1_ED24) may be included in the third green pixel PXG3, and the other green light emitting elements of the m green light emitting elements, for example, j green light emitting elements (hereinafter, referred to as fourth green light emitting elements G2_ED21 to G2_ED24) may be included in the fourth green pixel PXG4. As an example, k may be equal to j, and each of k and j may be m/2.

The second red light emitting elements R_ED21, R_ED22, R_ED23, and R_ED24 may emit the red light, the second blue light emitting elements B_ED21, B_ED22, B_ED23, and B_ED24 may emit the blue light. The third green light emitting elements G1_ED21 to G1_ED24 and the fourth green light emitting elements G2_ED21 to G2_ED24 may emit the green light.

The second red pixel PXR2 may further include a second red driving circuit R_PD2, e.g., a first driving circuit. The second red driving circuit R_PD2 may be electrically connected to corresponding n second red light emitting elements R_ED21 to R_ED24 and may substantially simultaneously control a drive of the n second red light emitting elements R_ED21 to R_ED24. The third green pixel PXG3 may further include a third green driving circuit G1_PD2, e.g., a first sub-driving circuit. The third green driving circuit G1_PD2 may be electrically connected to corresponding k third green light emitting elements G1_ED21 to G1_ED24 and may substantially simultaneously control a drive of the k third green light emitting elements G1_ED21 to G1_ED24. The fourth green pixel PXG4 may further include a fourth green driving circuit G2_PD2, e.g., a second sub-driving circuit. The fourth green driving circuit G2_PD2 may be electrically connected to corresponding j fourth green light emitting elements G2_ED21 to G2_ED24 and may substantially simultaneously control a drive of the j fourth green light emitting elements G2_ED21 to G2_ED24. The second blue pixel PXB2 may further include a second blue driving circuit B_PD2, e.g., a third driving circuit. The second blue driving circuit B_PD2 may be electrically connected to corresponding n second blue light emitting elements B_ED21 to B_ED24 and may substantially simultaneously control a drive of the n second blue light emitting elements B_ED21 to B_ED24.

As an example, n may be 4, however, it should not be limited thereto or thereby. In addition, m may be 8, and each of k and j may be 4, however, they should not be limited thereto or thereby. In addition, p may have the same value as that of n, and q may have the same value as that of m.

Each of the n second red light emitting elements R_ED21 to R_ED24 may have the same shape and the same size as those of the first red light emitting element R_ED1. The k third green light emitting elements G1_ED21 to G1_ED24 and the j fourth green light emitting elements G2_ED21 to G2_ED24 may have the same shape and the same size as those of the first green light emitting element G1_ED1 and the second green light emitting element G2_ED1, respectively. Each of the n second blue light emitting elements B_ED21 to B_ED24 may have the same shape and the same size as those of the first blue light emitting element B_ED1.

The second display area DA2 may include the first sub-area SA1 and the second sub-area SA2. For example, the fourth edge display area DA2_E4 of the second display area DA2 may be divided into the first sub-area SA1 and the second sub-area SA2. The third edge display area DA2_E3 (refer to FIG. 2C) of the second display area DA2 may also be divided into the first sub-area SA1 and the second sub-area SA2.

The driving circuits R_PD2, G1_PD2, G2_PD2, and B_PD2 included in each of the second reference units RU2 may be disposed in the first sub-area SA1, and the first and second scan drivers GDC1 and GDC2 may be disposed in the second sub-area SA2. Accordingly, the driving circuits R_PD2, G1_PD2, G2_PD2, and B_PD2 may not overlap the second scan driver GDC2 or the first scan driver GDC1. The light emitting elements included in each of the second reference units RU2 may be disposed in the first and second sub-areas SA1 and SA2.

Some light emitting elements of the second reference units RU2 may be disposed in the first sub-area SA1, and other light emitting elements of the second reference units RU2 may be disposed in the second sub-area SA2. Hereinafter, the light emitting elements disposed in the first sub-area SA1 will be referred to as a first light emitting element group, and the light emitting elements disposed in the second sub-area SA2 will be referred to as a second light emitting element group. The first light emitting element group may be disposed on the driving circuits R_PD2, G1_PD2, G2_PD2, and B_PD2 in the first sub-area SA1, and the second light emitting element group may be disposed on the second scan driver GDC2 or the first scan driver GDC1 in the second sub-area SA2. Accordingly, the second light emitting element group may not overlap the corresponding driving circuits R_PD2, G1_PD2, G2_PD2, and B_PD2 electrically connected thereto.

In FIG. 3B, the second red driving circuit R_PD2 may be commonly connected to the four second red light emitting elements R_ED21 to R_ED24, and the second blue driving circuit B_PD2 may be commonly connected to the four second blue light emitting elements B_ED21 to B_ED24. In addition, as shown in FIG. 31, the third green driving circuit G1_PD2 may be commonly connected to the four third green light emitting elements G1_ED21 to G1_ED24, and the fourth green driving circuit G2_PD2 may be commonly connected to the four fourth green light emitting elements G2_ED21 to G2_ED24. However, the present disclosure should not be limited thereto or thereby. As an example, the number of the second red light emitting elements R_ED21 to R_ED24 commonly connected to the second red driving circuit R_PD2 may be changed. In addition, the number of the second red light emitting elements R_ED21 to R_ED24 commonly connected to the second red driving circuit R_PD2 may be different from the number of the second blue light emitting elements B_ED21 to B_ED24 commonly connected to the second blue driving circuit B_PD2.

The number of the third green light emitting elements G1_ED21 to G1_ED24 commonly connected to the third green driving circuit G1_PD2 may be the same as the number of the fourth green light emitting elements G2_ED21 to G2_ED24 commonly connected to the fourth green driving circuit G2_PD2. In addition, the number of the third green light emitting elements G1_ED21 to G1_ED24 commonly connected to the third green driving circuit G1_PD2 may be the same as the number of the second red light emitting elements R_ED21 to R_ED24 commonly connected to the second red driving circuit R_PD2. However, the present disclosure should not be limited thereto or thereby. As an example, the number of the third green light emitting elements G1_ED21 to G1_ED24 commonly connected to the third green driving circuit G1_PD2 may be different from the number of the second red light emitting elements R_ED21 to R_ED24 commonly connected to the second red driving circuit R_PD2.

Referring to FIG. 3C, a first data line group DG1 including data lines DL1_1, DL1_2, DL1_3, DL1_4, DL1_5, DL1_6, DL1_7 and DL1_8 connected to the first reference units RU1 may be disposed in the first display area DA1, and a second data line group DG2 including data lines DL2_I, DL2_2, DL2_3, DL2_4, DL2_5, DL2_6, DL2_7 and DL2_8 connected to the second reference units RU2 may be disposed in the second display area DA2. For the convenience of explanation, FIG. 3C shows eight data lines DL1_1 to DL1_8 among the data lines included in the first data line group DG1 and eight data lines DL2_1 to DL2_8 among the data lines included in the second data line group DG2. However, the number of the data lines included in each of the first and second data line groups DG1 and DG2 should not be particularly limited.

The eight data lines DL1_1 to DL1_8 may be connected to each of the first reference units RU1 shown in FIG. 3C. Each of the first reference units RU1 may include four first red driving circuits R_PD1, four first blue driving circuits B_PD1, four first green driving circuits G1_PD1, and four second green driving circuits G2_PD1. In other words, the eight data lines DL1_1 to DL1_8 may be required to drive sixteen light emitting elements included in each of the first reference units RU1. However, each of the second reference units RU2 may be connected to four data lines DL2_1 to DL2_4 or DL2_5 to DL2_8. Each of the second reference units RU2 may include one second red driving circuit R_PD2, one second blue driving circuit B_PD2, one third green driving circuit G1_PD2, and one fourth green driving circuit G2_PD2. In other words, the four data lines DL2_1 to DL2_4 or DL2_5 to DL2_8 may be required to drive sixteen light emitting elements included in each of the second reference units RU2.

Figure 4:
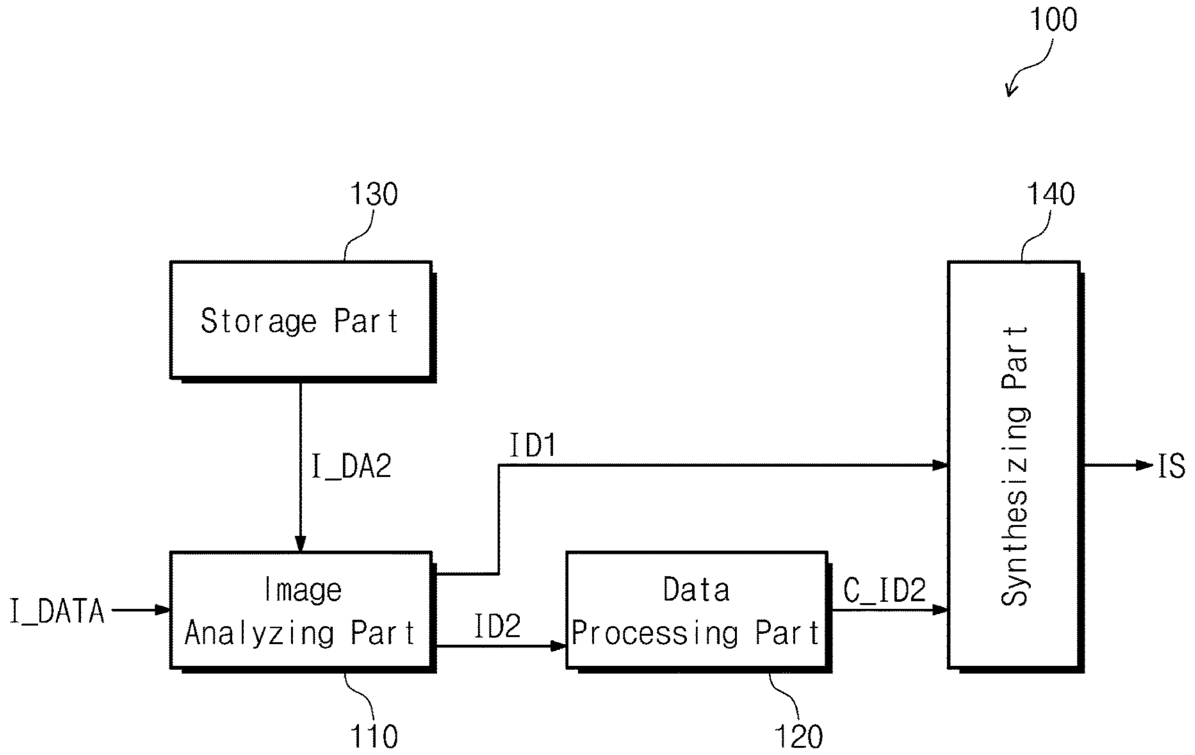
FIG. 4 is a block diagram of a controller according to an embodiment of the present disclosure.

FIG. 4 is a block diagram of the controller 100 according to an embodiment of the present disclosure.

Referring to FIGS. 3A and 4, the controller 100 may include an image analyzing part 110 and a data processing part 120.

The image analyzing part 110 may receive the image data I_DATA and may divide the image data I_DATA into first image data ID1 corresponding to the first display area DA1 and second image data ID2 corresponding to the second display area DA2 based on predetermined area information I_DA2.

The controller 100 may further include a storage part 130 and a synthesizing part 140. The storage part 130 may store the predetermined area information I_DA2. The predetermined area information I_DA2 may include area information about the second display area DA2. As an example, the predetermined area information I_DA2 may include information about the number of pixels included in the second reference unit RU2, the number of the light emitting elements included in the second reference unit RU2, a width of the second display area DA2, and the like. The image analyzing part 110 may be connected to the storage part 130 to receive the predetermined area information I_DA2.

The image analyzing part 110 may determine whether the image displayed through the second display area DA2 includes a specific pattern based on the second image data ID2. As an example, the specific pattern may be a pattern, e.g., a yellow pattern, a cyan pattern, a white pattern, etc., which requires the driving of the third green light emitting elements G1_ED21 to G1_ED24 or the fourth green light emitting elements G2_ED21 to G2_ED24. The specific pattern may also be referred to as a pattern, a first pattern, a predetermined pattern or a color pattern.

The data processing part 120 may be connected to the image analyzing part 110 to receive the determined result of the image analyzing part 110. The data processing part 120 may include a plurality of rendering parts to render the second image data ID2. The data processing part 120 may render the green image data in different rendering methods according to the determined result of the image analyzing part 110.

Descriptions on the data processing part 120 will be described in detail later with reference to FIGS. 5A to 6C.

As shown in FIG. 4, the data processing part 120 may render the second image data ID2 to output compensation data C_ID2. The compensation data C_ID2 generated by rendering the second image data ID2 may be provided to the synthesizing part 140.

The synthesizing part 140 may be connected to the image analyzing part 110 to receive the first image data ID1 and be connected to the data processing part 120 to receive the compensation data C_ID2. The synthesizing part 140 synthesizes the first image data ID1 and the compensation data C_ID2 to generate the image signal IS. The image signal IS may be output from the controller 100 and may be provided to the data driver 300.

Figure 5A:
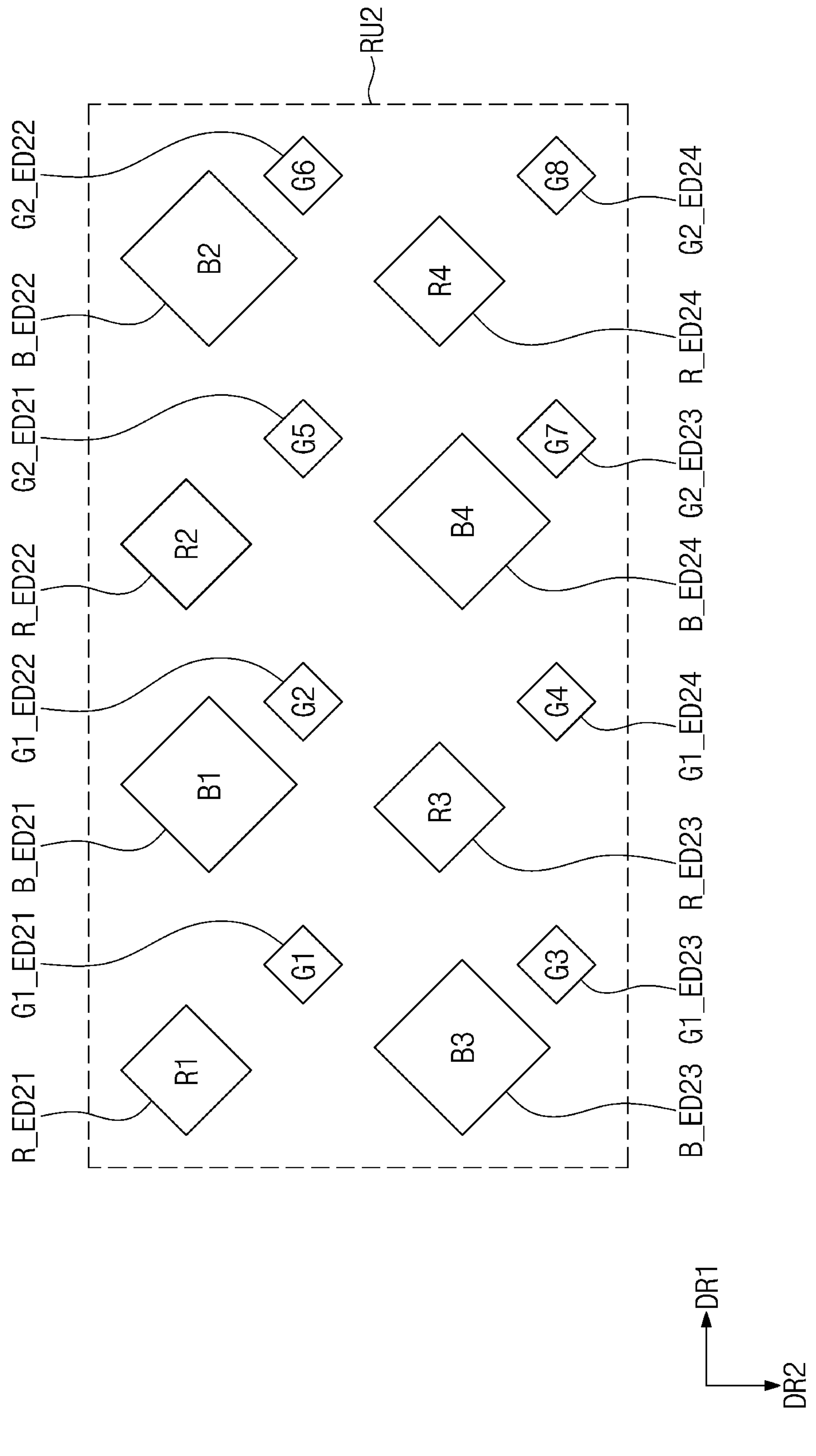
FIG. 5A is a view of image data input to correspond to a second reference unit according to an embodiment of the present disclosure.
Figure 5B:
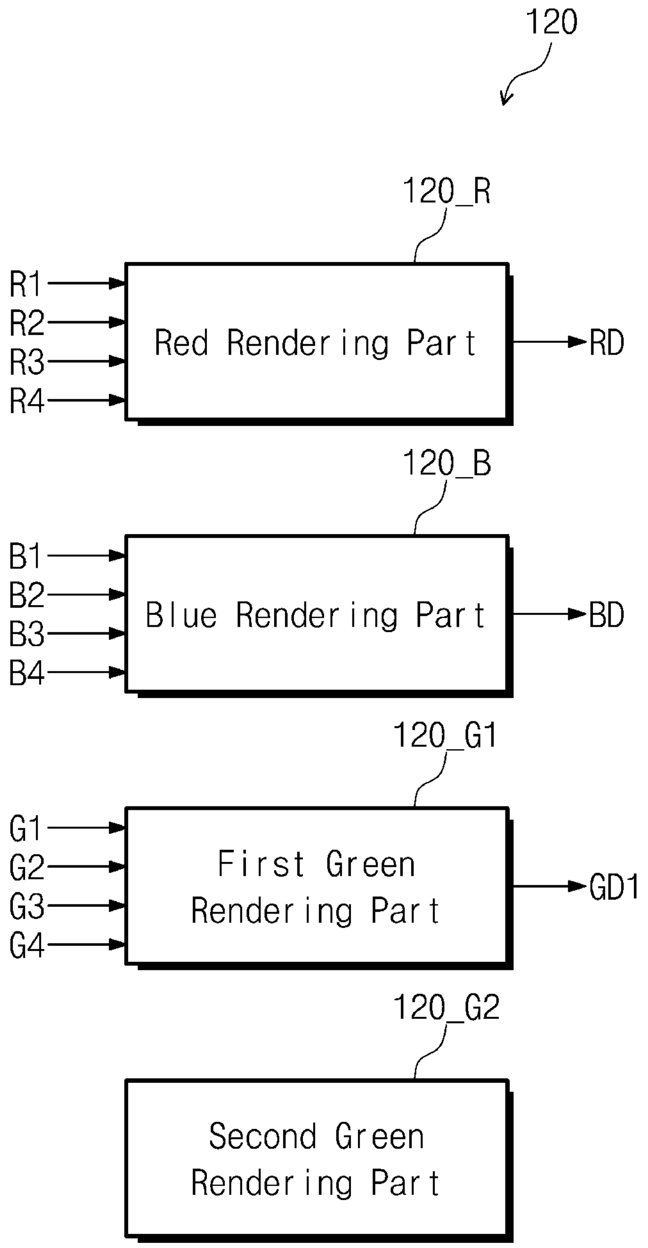
FIGS. 5B and 5C are block diagrams showing a rendering operation of a first manner according to an embodiment of the present disclosure.
Figure 5C:
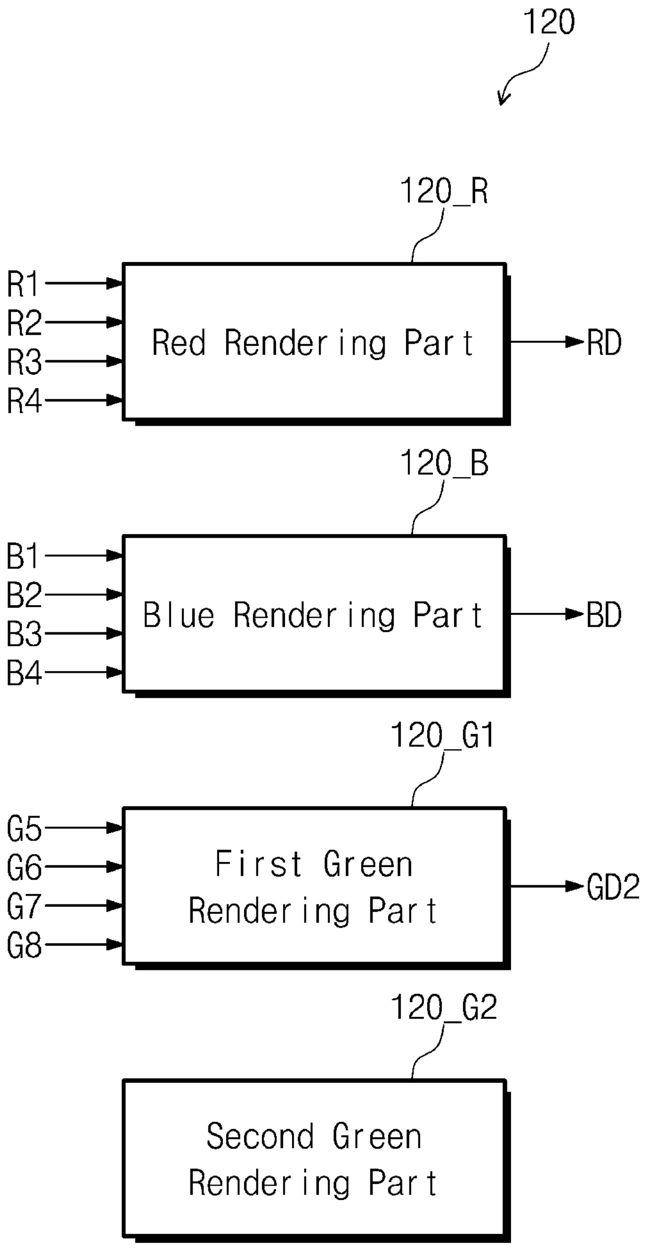
Figure 5D:
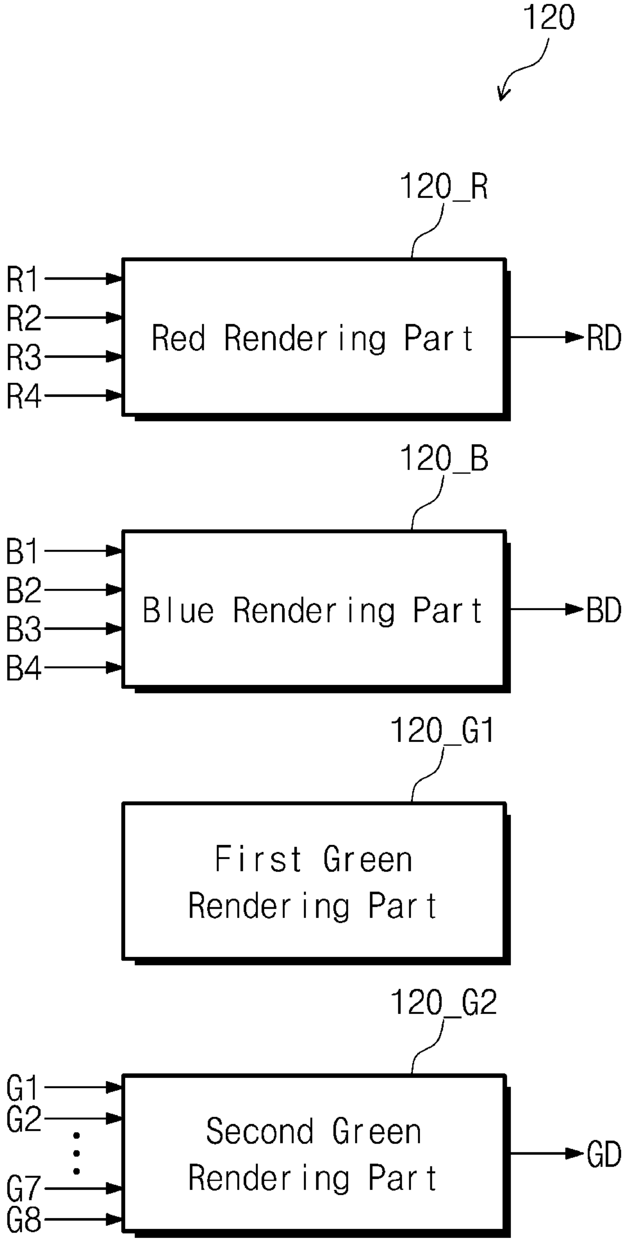
FIG. 5D is a block diagram showing a rendering operation of a second manner according to an embodiment of the present disclosure.
Figure 6A:
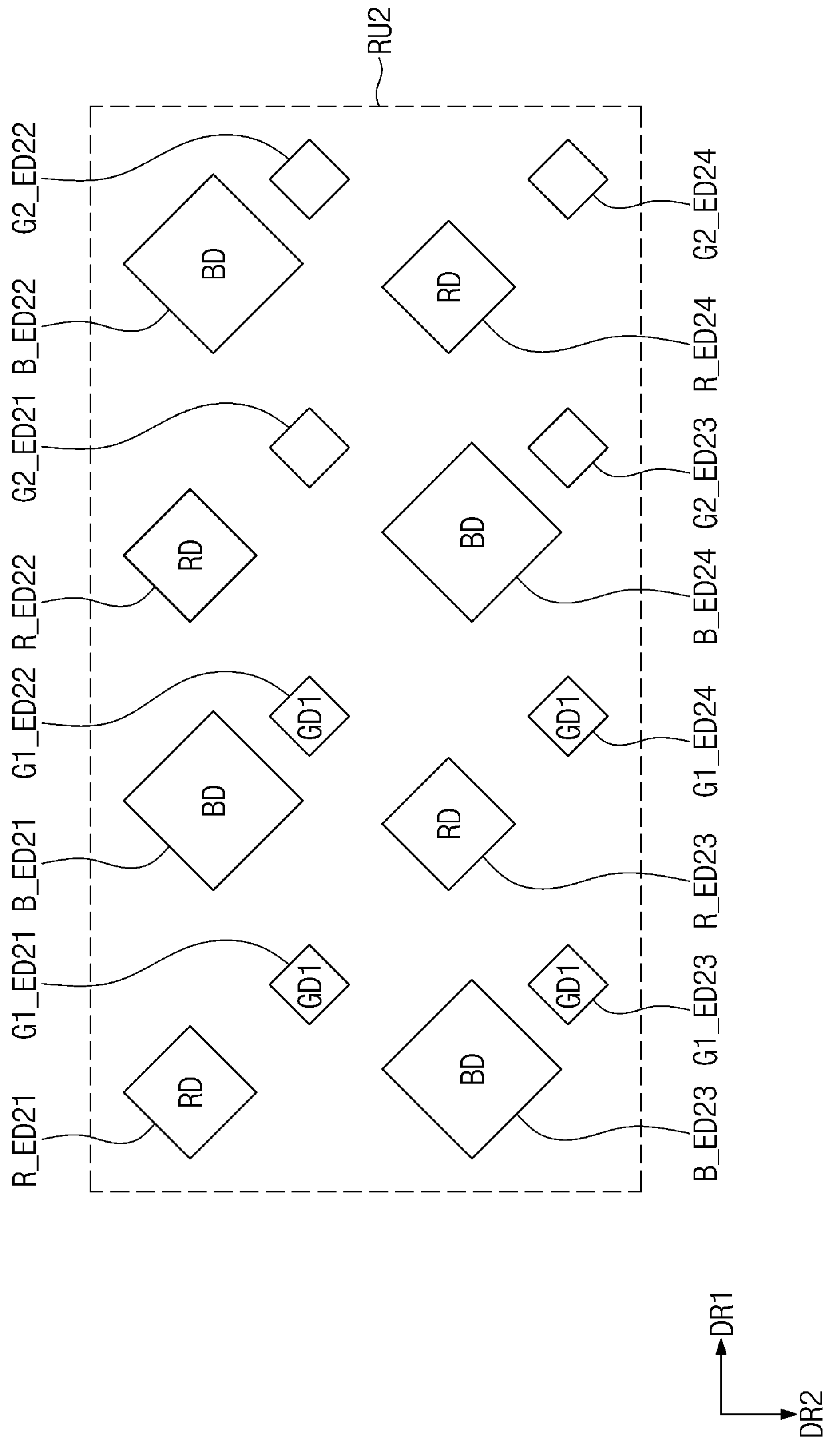
FIG. 6A is a view of a second reference unit driven by the rendering operation shown in FIG. 5B.
Figure 6B:
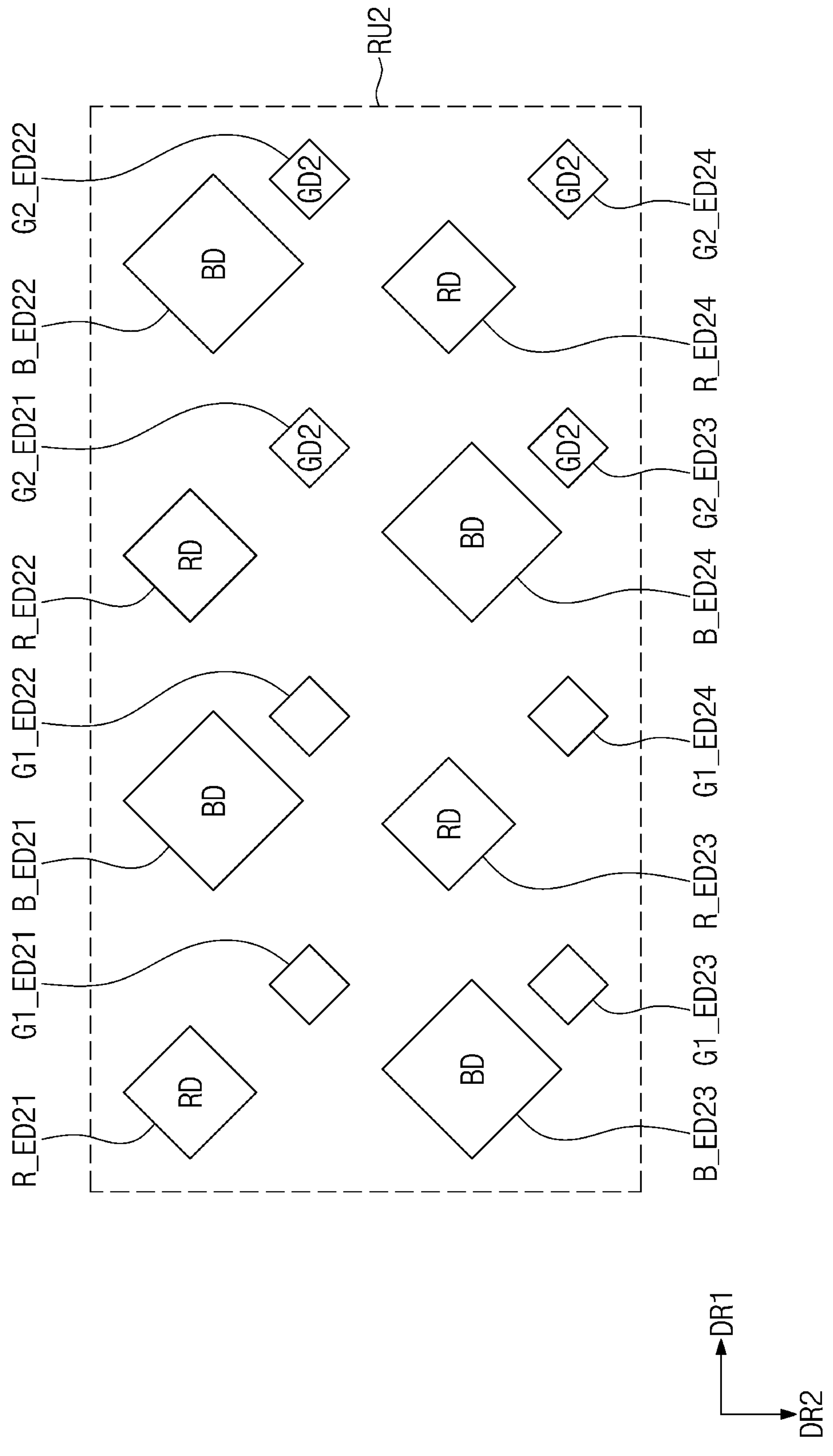
FIG. 6B is a view of a second reference unit driven by the rendering operation shown in FIG. 5C.
Figure 6C:
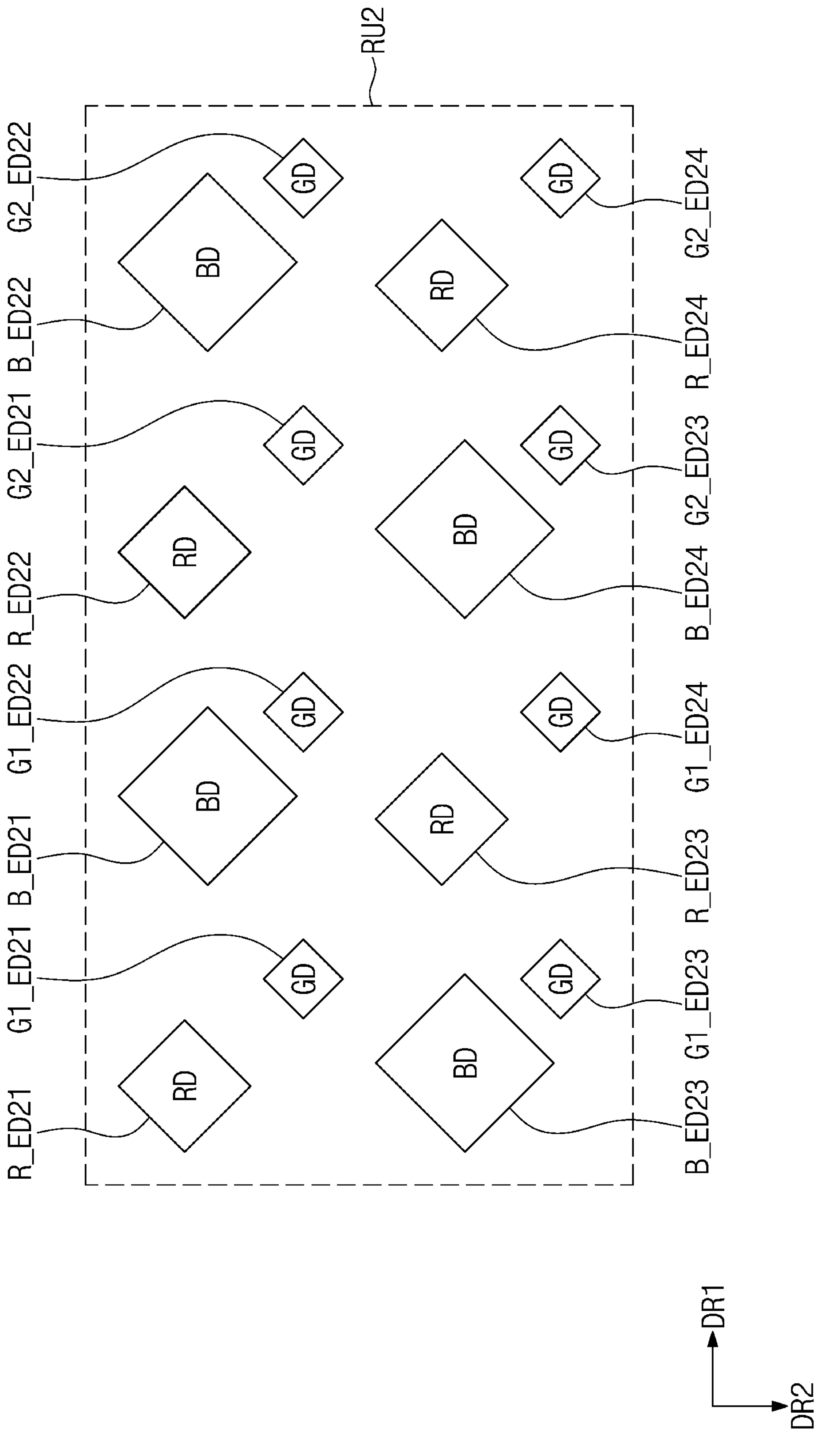
FIG. 6C is a view of a second reference unit driven by the rendering operation shown in FIG. 5D.

FIG. 5A is a view of image data input to correspond to a second reference unit according to an embodiment of the present disclosure, and FIGS. 5B and 5C are block diagrams showing a rendering operation of a first manner according to an embodiment of the present disclosure. FIG. 5D is a block diagram showing a rendering operation of a second manner according to an embodiment of the present disclosure. FIG. 6A is a view of a second reference unit driven by the rendering operation shown in FIG. 5B. FIG. 6B is a view of a second reference unit driven by the rendering operation shown in FIG. 5C. FIG. 6C is a view of a second reference unit driven by the rendering operation shown in FIG. 5D.

Referring to FIGS. 4, 5A to 5D, the data processing part 120 may include a red rendering part 120_R, e.g., a first color rendering part, a blue rendering part 120_B. e.g., a third color rendering part, a first green rendering part 120_G1, e.g., a first manner rendering part, and a second green rendering part 120_G2, e.g., a second manner rendering part. The first manner may be referred to as a first operation or a first method, and the second manner may be referred to as a second operation or a second method.

The red rendering part 120_R may receive n red image data, e.g., n first color image data, respectively corresponding to the n second red light emitting elements R_ED21, R_ED22, R_ED23, and R_ED24 included in the second reference unit RU2. As an example, the n red image data may be first, second, third, and fourth red image data R1, R2, R3, and R4. One second red driving circuit R_PD2 (refer to FIG. 3B) commonly connected to the four second red light emitting elements R_ED21, R_ED22, R_ED23, and R_ED24 may be disposed in the second reference unit RU2. Accordingly, the red rendering part 120_R may render the first, second, third, and fourth red image data R1, R2, R3, and R4 to one red compensation data RD.

The blue rendering part 120_B may receive n blue image data, e.g., n third color image data, respectively corresponding to the n second blue light emitting elements B_ED21, B_ED22, B_ED23, and B_ED24 included in the second reference unit RU2. As an example, the n blue image data may be first, second, third, and fourth blue image data B1, B2, B3, and B4. One second blue driving circuit B_PD2 (refer to FIG. 3B) commonly connected to the four second blue light emitting elements B_ED21, B_ED22, B_ED23, and B_ED24 may be disposed in the second reference unit RU2. Accordingly, the blue rendering part 120_B may render the first, second, third, and fourth blue image data B1, B2, B3, and B4 to one blue compensation data BD.

Some of m green image data, e.g., m second color image data, respectively corresponding to the m green light emitting elements G1_ED21, G1_ED22, G1_ED23, G1_ED24, G2_ED21, G2_ED22, G2_ED23, and G2_ED24 included in the second reference unit RU2 may be provided to the first green rendering part 120_G1. As an example, the m green image data may be first, second, third, fourth, fifth, sixth, seventh, and eighth green image data G1, G2, G3, G4, G5, G6, G7, and G8, and among them, four green image data G1 to G4 or G5 to G8 may be provided to the first green rendering part 120_G1. In FIG. 5B, four green image data G1 to G4 are provided to the first green rendering part 120_G1. The first to fourth green image data G1 to G4 may be green image data respectively corresponding to the third green light emitting elements G1_ED21 to G1_ED24 arranged in two rows by two columns (2×2) along the first and second directions DR1 and DR2. The fifth to eighth green image data G5 to G8 may be green image data respectively corresponding to the fourth green light emitting elements G2_ED21 to G2_ED24 arranged in two rows by two columns (2×2) along the first and second directions DR1 and DR2.

The third green driving circuit G1_PD2 commonly connected to the k third green light emitting elements G1_ED21 to G1_ED24 and the fourth green driving circuit G2_PD2 commonly connected to the j fourth green light emitting elements G2_ED21 to G2_ED24 may be disposed in the second reference unit RU2. The third green driving circuit G1_PD2 and the fourth green driving circuit G2_PD2 may be selectively operated.

In the case where the third green driving circuit G1_PD2 is operated, the first green rendering part 120_G1 may render the first to fourth green image data G1 to G4 to the first green compensation data GD1. In this case, the fifth to eighth green image data G5 to G8 may be discarded instead of being used to display images. This situation is illustrated in FIG. 5B.

In the case where the fourth green driving circuit G2_PD2 is operated, the first green rendering part 120_G1 may render the fifth to eighth green image data G5 to G8 to the second green compensation data GD2. In this case, the first to fourth green image data G1 to G4 may be discarded instead of being used to display images. This situation is illustrated in FIG. 5C. In this case, the rendering operation using the first green rendering part 120_G1 may be referred to as a first rendering manner.

All m green image data, e.g., the first to eighth green image data G1, G2, G3, G4, G5, G6, G7, and G8, respectively corresponding to the m green light emitting elements G1_ED21, G1_ED22, G1_ED23, G1_ED24, G2_ED21, G2_ED22, G2_ED23, and G2_ED24 included in the second reference unit RU2 may be provided to the second green rendering part 120_G2. The second green rendering part 120_G2 may render the first to eighth green image data G1 to G8 to integrated green compensation data GD. The third green driving circuit G1_PD2 commonly connected to the k green light emitting elements G1_ED21 to G1_ED24 and the fourth green driving circuit G2_PD2 commonly connected to the j green light emitting elements G2_ED21 to G2_ED24 may be disposed in the second reference unit RU2. The data signal corresponding to the integrated green compensation data GD may be commonly applied to the third and fourth green driving circuits G1_PD2 and G2_PD2. In this case, the rendering operation using the second green rendering part 120_G2 may be referred to as a second rendering manner.

Referring to FIGS. 5A to 5D and 6A to 6C, in a case where the second reference unit RU2 displays a white pattern, the red rendering part 120_R may generate the red compensation data RD based on the first, second, third, and fourth red image data R1, R2, R3, and R4. Here, a data signal corresponding to the red compensation data RD may be commonly applied to the four second red light emitting elements R_ED21, R_ED22, R_ED23, and R_ED24.

The blue rendering part 120B may generate the blue compensation data BD based on the first to fourth blue image data B1, B2, B3, and B4. Here, a data signal corresponding to the blue compensation data BD may be commonly applied to the four blue light emitting elements B_ED21, B_ED22, B_ED23, and B_ED24.

Referring to FIGS. 5B and 6A, in a case where the third green driving circuit G1_PD2 is operated and the white pattern is displayed, the first green rendering part 120_G1 may generate the first green compensation data GD1 based on the first to fourth green image data G1 to G4. Here, a data signal corresponding to the first green compensation data GD1 may be commonly applied to the four third green light emitting elements G1_ED21 to G_ED24. In the case where the third green driving circuit G1_PD2 is operated and the white pattern is displayed, the data signal may not be applied to the four fourth green light emitting elements G2_ED21 to G2_ED24 connected to the fourth green driving circuit G2_PD2.

As shown in FIGS. 5C and 6B, in a case where the fourth green driving circuit G2_PD2 is operated and the white pattern is displayed, the first green rendering part 120_G1 may generate the second green compensation data GD2 based on the fifth to eighth green image data G5 to G8. Here, a data signal corresponding to the second green compensation data GD2 may be commonly applied to the four fourth green light emitting elements G2_ED21 to G2_ED24. In the case where the fourth green driving circuit G2_PD2 is operated and the white pattern is displayed, the data signal may not be applied to the four third green light emitting elements G1_ED21 to G1_ED24 connected to the third green driving circuit G1_PD2.

However, when only one of the third green driving circuit G1_PD2 and the fourth green driving circuit G2_PD2 is operated and the white pattern is displayed, a band of a specific color may be formed at a right or left side of the white pattern, for example, at one side or the other side in the second direction DR2. Due to this phenomenon, an image quality in the second display area DA2 (refer to FIG. 2A) of the display device DD (refer to FIG. 1A or FIG. 2A) may be deteriorated. In a case where the specific pattern is displayed in the second display area DA2, the first to eighth green image data G1 to G8 may be rendered in the second rendering manner using the second green rendering part 120_G2 rather than the first green rendering part 120_G1 to improve the image quality of the second display area DA2.

As shown in FIGS. 4, 5D, and 6C, when it is determined that the specific pattern is included in the second image data ID2, the first to eighth green image data G1 to G8 may be provided to the second green rendering part 120_G2. The second green rendering part 120_G2 may generate one integrated green compensation data GD based on the first to eighth green image data G1 to G8. A data signal corresponding to the generated integrated green compensation data GD may be commonly applied to the four third green light emitting elements G1_ED21 to G1_ED24 and the four fourth green light emitting elements G2_ED21 to G2_ED24.

As an example, in the case where the white pattern is displayed, the four third green light emitting elements G1_ED21 to G1_ED24 connected to the third green driving circuit G1_PD2 and the four fourth green light emitting elements G2_ED21 to G2_ED24 connected to the fourth green driving circuit G2_PD2 may substantially simultaneously receive the data signal corresponding to the integrated green compensation data GD. Since all of the green light emitting elements G1_ED21 to G1_ED24 and G2_ED21 to G2_ED24 of the second reference unit RU2 are operated to display the white pattern, the band of the specific color may be prevented from being formed at the right or left side of the white pattern. Accordingly, even though the specific pattern is displayed in the second display area DA2 of the display device DD, the image quality may be prevented from being deteriorated.

In an embodiment of the present disclosure, the display device DD includes: a display panel DP including a first display area DA1 and a second display area DA2 adjacent to the first display area DA1; and a panel driver DPD receiving image data I_DATA and controlling the display panel DP based on the image data I_DATA, wherein a plurality of second reference units RU2 is disposed in the second display area DA2, each of the second reference units RU2 include n first color light emitting elements R_ED21-R_ED24 and m second color light emitting elements G_ED21-G1-ED24 and G2_ED21-G2_ED24, each of the n and the m is a natural number equal to or greater than 1, the m is greater than the n, and the panel driver DPD includes: an image analyzing part 110 determining whether an image displayed in the second display area DA2 includes a first pattern based on the image data I_DATA; and a data processing part 120 rendering n first color image data R1-R4 corresponding to the n first color light emitting elements R_ED21-R_ED24 to generate first color compensation data RD and rendering m second color image data G1-G8 corresponding to the m second color light emitting elements G1_ED21-G1-ED24 and G2_ED21-G2_ED24 in one of first and second rendering operations selected according to whether the image displayed in the second display area DA2 includes the first pattern to generate second color compensation data GD1, GD2 or GD.

Figure 7A:
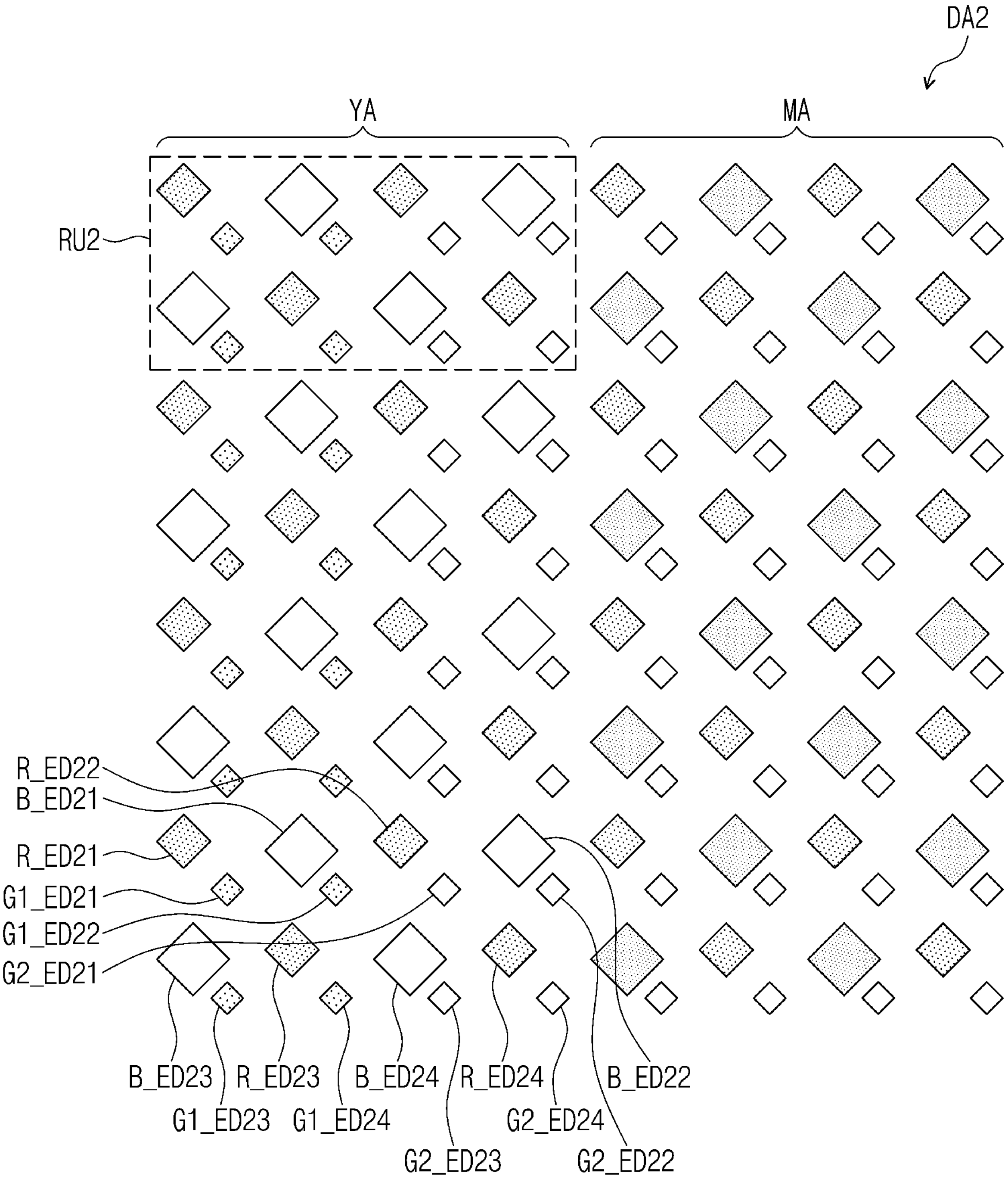
FIG. 7A is a view of first and second specific patterns displayed in a second display area using a first green rendering part according to an embodiment of the present disclosure.
Figure 7B:
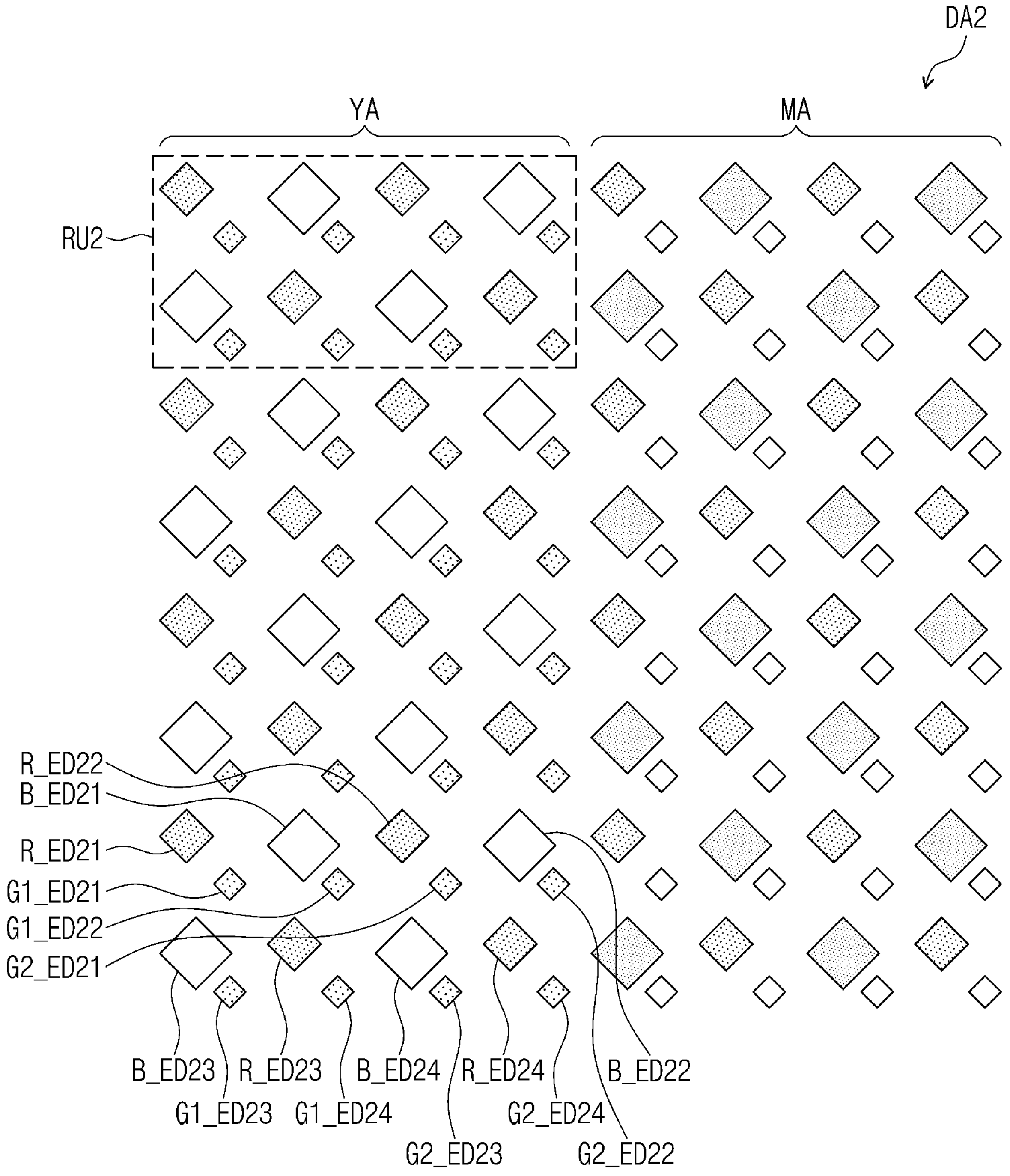
FIG. 7B is a view of first and second specific patterns displayed in a second display area using a second green rendering part according to an embodiment of the present disclosure.
Figure 8A:
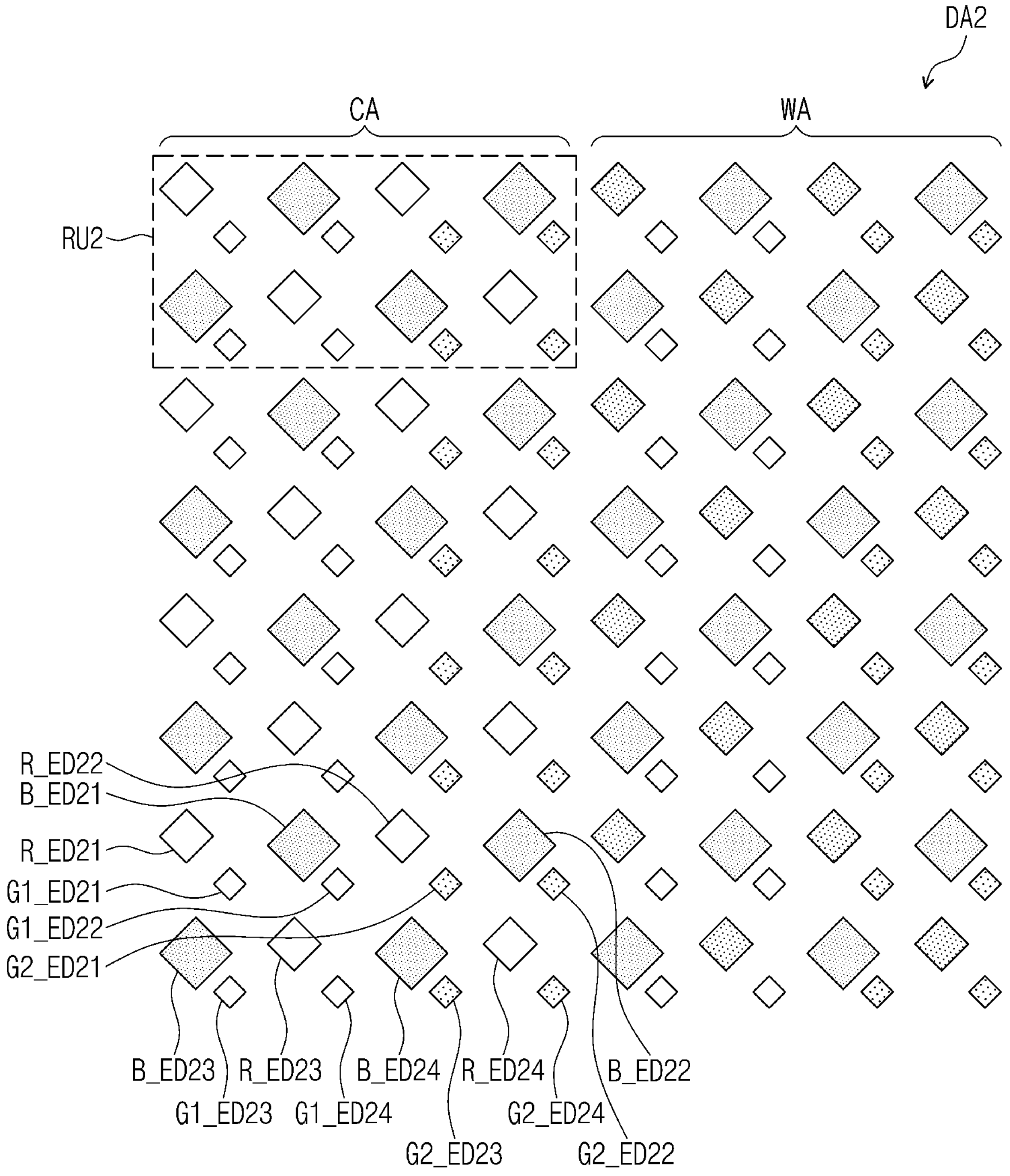
FIG. 8A is a view of third and fourth specific patterns displayed in a second display area using a first green rendering part according to an embodiment of the present disclosure.
Figure 8B:
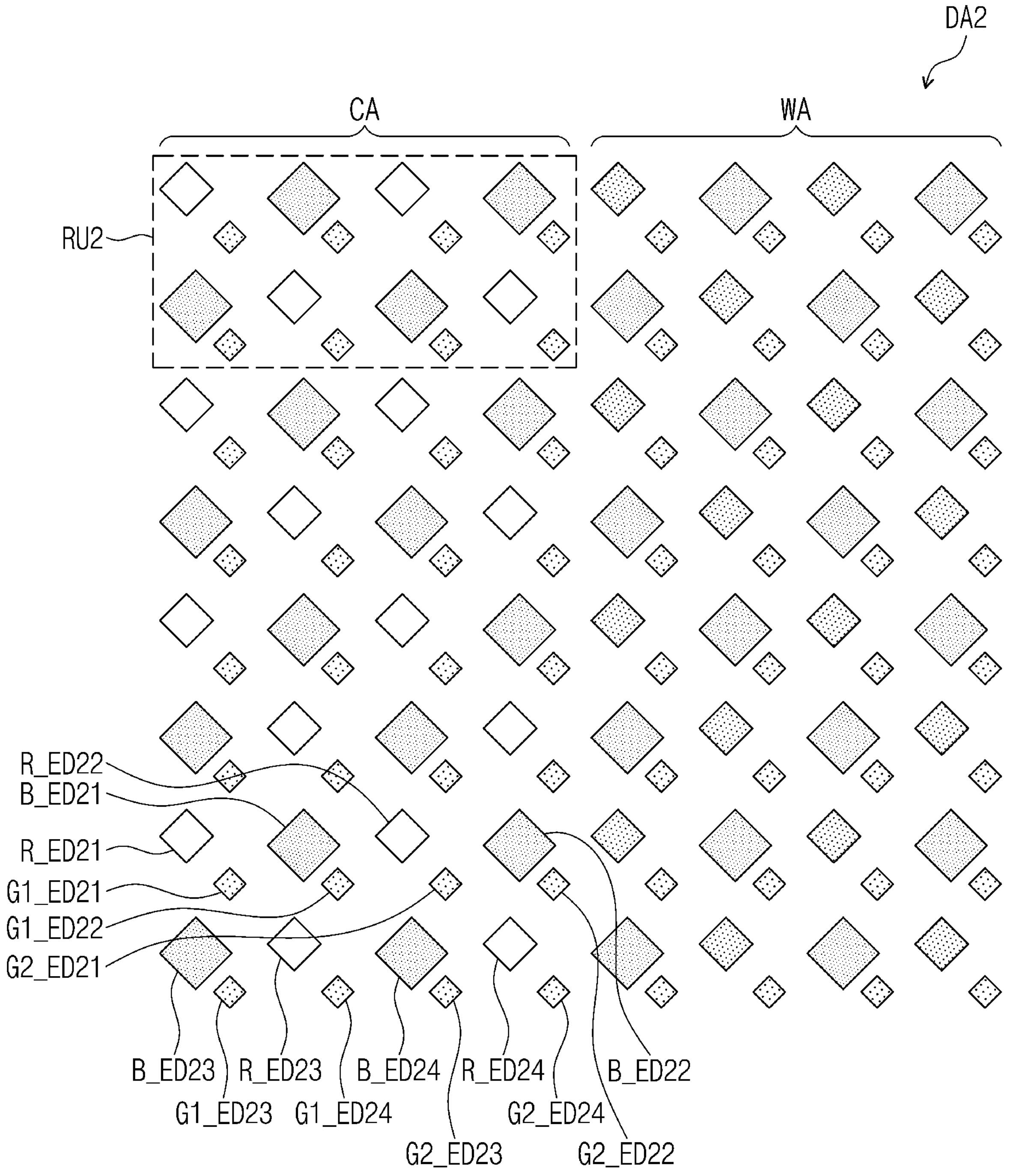
FIG. 8B is a view of third and fourth specific patterns displayed in a second display area using a second green rendering part according to an embodiment of the present disclosure.

FIG. 7A is a view of first and second specific patterns displayed in the second display area using the first green rendering part according to an embodiment of the present disclosure. FIG. 7B is a view of first and second specific patterns displayed in the second display area using the second green rendering part according to an embodiment of the present disclosure. FIG. 8A is a view of third and fourth specific patterns displayed in the second display area using the first green rendering part according to an embodiment of the present disclosure. FIG. 8B is a view of third and fourth specific patterns displayed in the second display area using the second green rendering part according to an embodiment of the present disclosure.

Referring to FIGS. SA to 5D, 7A, and 7B, the second display area DA2 may include a first area YA in which a first specific pattern (e.g., the yellow pattern) is displayed and a second area MA in which a second specific pattern (e.g., a magenta pattern) is displayed. The first specific pattern may be a pattern that is displayed in a yellow color by the second red light emitting elements R_ED21 to R_ED24 and the third green light emitting elements G1_ED21 to G1_ED24, and the second specific pattern may be a pattern that is displayed in a magenta color by the second red light emitting elements R_ED21 to R_ED24 and the second blue light emitting elements B_ED21 to B_ED24.

The red rendering part 120_R may generate the red compensation data RD based on the first, second, third, and fourth red image data R1, R2, R3, and R4 with respect to the first area YA. Here, the data signal based on the red compensation data RD may be commonly applied to the second red light emitting elements R_ED21 to R_ED24 disposed in the first area YA.

The first green rendering part 120_G1 may generate the first green compensation data GD1 based on the first, second, third, and fourth green image data G1, G2, G3, and G4 with respect to the first area YA. Here, the data signal based on the first green compensation data GD1 may be commonly applied to the third green light emitting elements G1_ED21 to G1_ED24 disposed in the first area YA. The fifth, sixth, seventh, and eighth green image data G5, G6, G7, and G8 may be discarded instead of being rendered by the first green rendering part 120_G1.

Accordingly, when the first, second, third, and fourth green image data G1, G2, G3, and G4 are rendered by the first rendering manner using the first green rendering part 120_G1, a band of a red color, not a yellow color, may be viewed in the right side of the first area YA.

The red rendering part 120_R may generate the red compensation data RD based on the first, second, third, and fourth red image data R1, R2, R3, and R4 with respect to the second area MA. Here, the data signal based on the red compensation data RD may be commonly applied to the second red light emitting elements R_ED21, R_ED22, R_ED23, and R_ED24 disposed in the second area MA.

The blue rendering part 120_B may generate the blue compensation data BD based on the first, second, third, and fourth blue image data B1, B2, B3, and B4 with respect to the second area MA. Here, the data signal based on the blue compensation data BD may be commonly applied to the second blue light emitting elements B_ED21, B_ED22, B_ED23, and B_ED24 disposed in the second area MA.

In the case where the second specific pattern is displayed in the second area MA, the third and fourth green light emitting elements G1_ED21 to G1_ED24 and G2_ED21 to G2_ED24 are not required to be operated, and thus, the band of the specific color may not be generated in the second area MA.

Accordingly, the first specific pattern may be determined as a pattern that needs to be rendered by the second green rendering part 120_G2 using the second rendering manner, and the second specific pattern may be determined as a pattern that needs to be rendered by the first green rendering part 120_G1 using the first rendering manner.

In the case where the second rendering manner using the second green rendering part 120_G2 is used to display the first specific pattern, as shown in FIG. 7B, the second green rendering part 120_G2 may generate the integrated green compensation data GD based on the first, second, third, fourth, fifth, sixth, seventh, and eighth green image data G1, G2, G3, G4, G5, G6, G7, and G8 with respect to the first area YA. Here, the data signal based on the integrated green compensation data GD may be commonly applied to the third and fourth green light emitting elements G1_ED21 to G1_ED24 and G2_ED21 to G2_ED24 disposed in the first area YA.

Accordingly, although the first specific pattern is displayed in the first area YA, all of the third and fourth green light emitting elements G1_ED21 to G1_ED24 and G2_ED21 to G2_ED24 disposed in the first area YA are operated, and thus, the band of the specific color may be prevented from being formed at the left or right sides of the first area YA.

Referring to FIGS. 5A to 5D, 8A, and 8B, the second display area DA2 may include a third area CA in which a third specific pattern (e.g., the cyan pattern) is displayed and a fourth area WA in which a fourth specific pattern (e.g., the white pattern) is displayed. The third specific pattern may be a pattern that is displayed in a cyan color by the second blue light emitting elements B_ED21 to B_ED24 and the fourth green light emitting elements G2_ED21 to G2_ED24. The fourth specific pattern may be a pattern that is displayed in a white color by the second red light emitting elements R_ED21 to R_ED24, the second blue light emitting elements B_ED21 to B_ED24, and the fourth green light emitting elements G2_ED21 to G2_ED24.

The blue rendering part 120_B may generate the blue compensation data BD based on the first, second, third, and fourth blue image data B1, B2, B3, and B4 with respect to the third area CA. Here, the data signal based on the blue compensation data BD may be commonly applied to the second blue light emitting elements B_ED21 to B_ED24 disposed in the third area CA.

The first green rendering part 120_G1 may generate the second green compensation data GD2 based on the fifth, sixth, seventh, and eighth green image data G5, G6, G7, and G8 with respect to the third area CA. Here, the data signal based on the second green compensation data GD2 may be commonly applied to the fourth green light emitting elements G2_ED21 to G2_ED24 disposed in the third area CA.

Accordingly, in the case where the fifth, sixth, seventh, and eighth green image data G5, G6, G7, and G8 are rendered by the first green rendering part 120_G1 in the first rendering manner, a band of a blue color, not the cyan color, may appear at the left side of the third area CA.

The red rendering part 120_R may generate the red compensation data RD based on the first, second, third, and fourth red image data R1, R2, R3, and R4 with respect to the fourth area WA. Here, the data signal based on the red compensation data RD may be commonly applied to the second red light emitting elements R_ED21 to R_ED24 disposed in the fourth area WA.

The blue rendering part 120_B may generate the blue compensation data BD based on the first, second, third, and fourth blue image data B1, B2, B3, and B4. Here, the data signal based on the blue compensation data BD may be commonly applied to the second blue light emitting elements B_ED21 to B_ED24 disposed in the fourth area WA.

The first green rendering part 120_G1 may generate the second green compensation data GD2 based on the fifth, sixth, seventh, and eighth green image data G5, G6, G7, and G8 with respect to the fourth area WA. Here, the data signal based on the second green compensation data GD2 may be commonly applied to the fourth green light emitting elements G2_ED21 to G2_ED24 disposed in the fourth area WA.

Accordingly, when the fifth, sixth, seventh, and eighth green image data G5, G6, G7, and G8 are rendered in the first rendering manner using the first green rendering part 120_G1, a band of the magenta color, not the white color, may appear at a left side of the fourth area WA. Thus, the third and fourth specific patterns may be determined as patterns that need to be rendered in the second rendering manner using the second green rendering pan 120_G2.

In a case where the second rendering manner using the second green rendering part 120_G2 is used to display the third specific pattern, the second green rendering part 120_G2 may generate the integrated green compensation data GD based on the first, second, third, fourth, fifth, sixth, seventh, and eighth green image data G1, G2, G3, G4, G5, G6, G7, and G8 with respect to the third area CA. Here, the data signal based on the integrated green compensation data GD may be commonly applied to the third and fourth green light emitting elements G1_ED21 to G1_ED24 and G2_ED21 to G2_ED24 disposed in the third area CA.

Accordingly, even though the third specific pattern is displayed in the third area CA, all of the third and fourth green light emitting elements G1_ED21 to G1_ED24 and G2_ED21 to G2_ED24 disposed in the third area CA may be operated, and as a result, the band of the specific color may be prevented from being formed at the left or right side of the third area CA.

In the case where the second rendering manner using the second green rendering part 120_G2 is used to display the fourth specific pattern, the second green rendering pan 120_G2 may generate the integrated green compensation data GD based on the first, second, third, fourth, fifth, sixth, seventh, and eighth green image data G1, G2, G3, G4, G5, G6, G7, and G8 with respect to the fourth area WA. Here, the data signal based on the integrated green compensation data GD may be commonly applied to the third and fourth green light emitting elements G1_ED21 to G1_ED24 and G2_ED21 to G2_ED24 disposed in the fourth area WA.

Accordingly, even though the fourth specific pattern is displayed in the fourth area WA, all of the third and fourth green light emitting elements G1_ED21 to G1_ED24 and G2_ED21 to G2_ED24 disposed in the fourth area WA may be operated, and as a result, the band of the specific color may be prevented from being formed at the left or right side of the fourth area WA.

As described above, not the first rendering manner but the second rendering manner is used when the specific pattern is displayed in the second display area DA2 of the display device DD, and thus, the deterioration in image quality of the second display area DA2 may be prevented.

Figure 9:
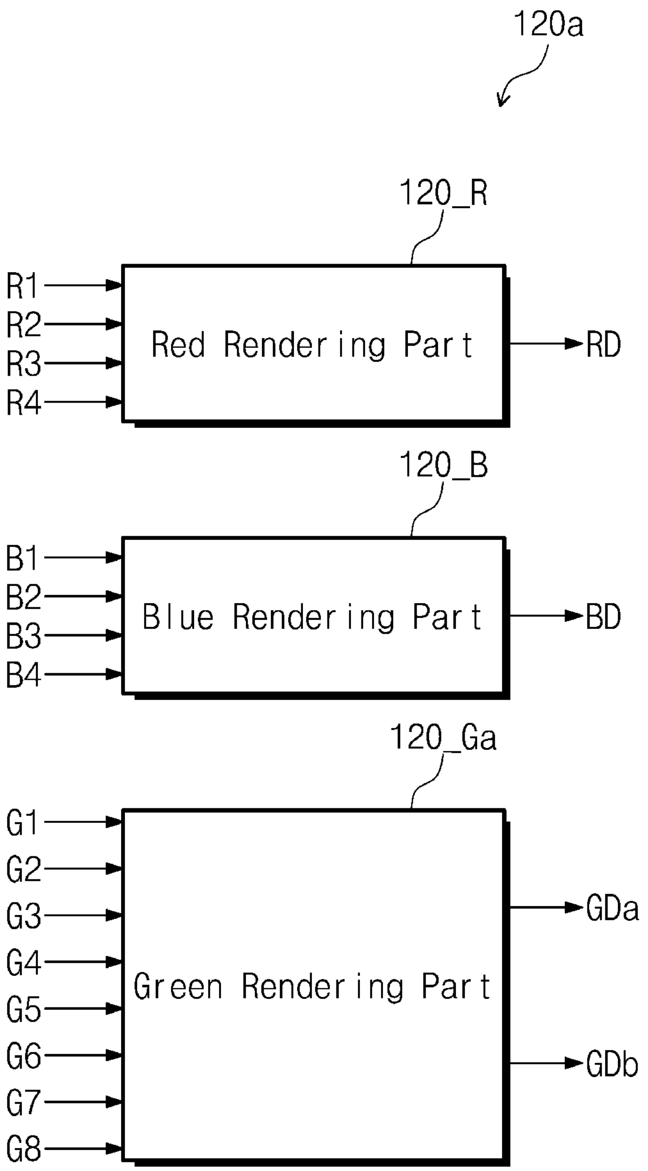
FIG. 9 is a block diagram of a data processing part according to an embodiment of the present disclosure.
Figure 10:
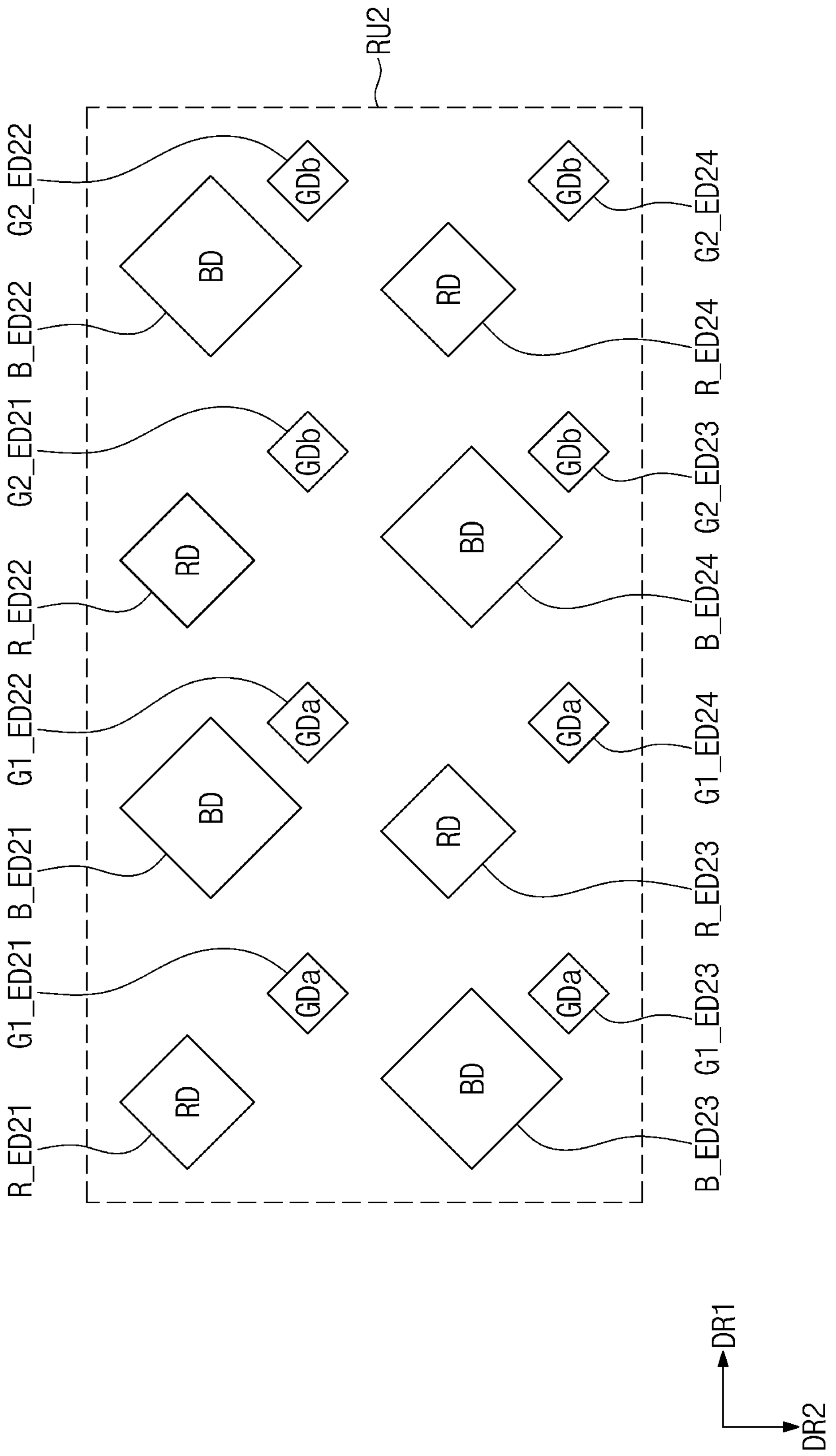
FIG. 10 is a view of a second reference unit driven by the rendering operation shown in FIG. 9.

FIG. 9 is a block diagram of a data processing part 120*a* according to an embodiment of the present disclosure, and FIG. 10 is a view of a second reference unit driven by a rendering operation shown in FIG. 9.

Referring to FIGS. 9 and 10, the data processing part 120*a* may include a red rendering part 120_R, a blue rendering part 120_B, and a green rendering part 120_Ga. The red rendering part 120_R and the blue rendering part 120_B are substantially the same as the red rendering part 120_R and the blue rendering part 120_B shown in FIGS. 5B to 5D, and thus details thereof will be omitted.

The green rendering part 120_Ga may receive m image data (e.g., first, second, third, fourth, fifth, sixth, seventh, and eighth green image data G1, G2, G3, G4, G5, G6, G7, and G8) respectively corresponding to m green light emitting elements G1_ED21, G1_ED22, G1_ED23, G1_ED24, G2_ED21, G2_ED22, G2_ED23, and G2_ED24 included in the second reference unit RU2. A third green driving circuit G1_PD2 (refer to FIG. 3B) commonly connected to k third green light emitting elements G1_ED21 to G1_ED24 and a fourth green driving circuit G2_PD2 (refer to FIG. 3B) commonly connected to j fourth green light emitting elements G2_ED21 to G2_ED24 may be disposed in the second reference unit RU2. As an example, m may be 8, and each of k and j may be 4. However, a value of each of m, k, and j may be changed in various ways. The green rendering part 120_Ga may render the first to fourth green image data G1 to G4 to first green compensation data GDa, e.g., first sub-compensation data, and may render the fifth to eighth green image data G5 to G8 to second green compensation data GDa, e.g., second sub-compensation data.

As an example, in a case where the second reference unit RU2 displays a white pattern, the red rendering part 120_R may generate red compensation data RD based on first, second, third, and fourth red image data R1, R2, R3, and R4. A data signal corresponding to the red compensation data RD may be commonly applied to four second red light emitting elements R_ED21, R_ED22, R_ED23, and R_ED24.

The blue rendering part 120_B may generate blue compensation data BD based on first, second, third, and fourth blue image data B1, B2, B3, and B4. A data signal corresponding to the blue compensation data BD may be commonly applied to four blue light emitting elements B_ED21, B_ED22, B_ED23, and B_ED24.

The green rendering part 120_Ga may generate the first green compensation data GDa based on the first to fourth green image data G1 to G4 of the first to eighth green image data G1 to G8 and may generate the second green compensation data GDb based on the fifth to eighth green image data G5 to G8 of the first to eighth green image data G1 to G8. A data signal corresponding to the first green compensation data GDa may be commonly applied to the four third green light emitting elements G1_ED21 to G1_ED24, and a data signal corresponding to the second green compensation data GDb may be commonly applied to the four fourth green light emitting elements G2_ED21 to G2_ED24.

Accordingly, even though the specific pattern is displayed in the second display area DA2, all the third and fourth green light emitting elements G1_ED21 to G1_ED24 and G2_ED21 to G2_ED24 included in the second reference unit RU2 may be operated, and as a result, the band of the specific color may be prevented from being formed at a left or right side of the specific pattern.

Figure 11A:
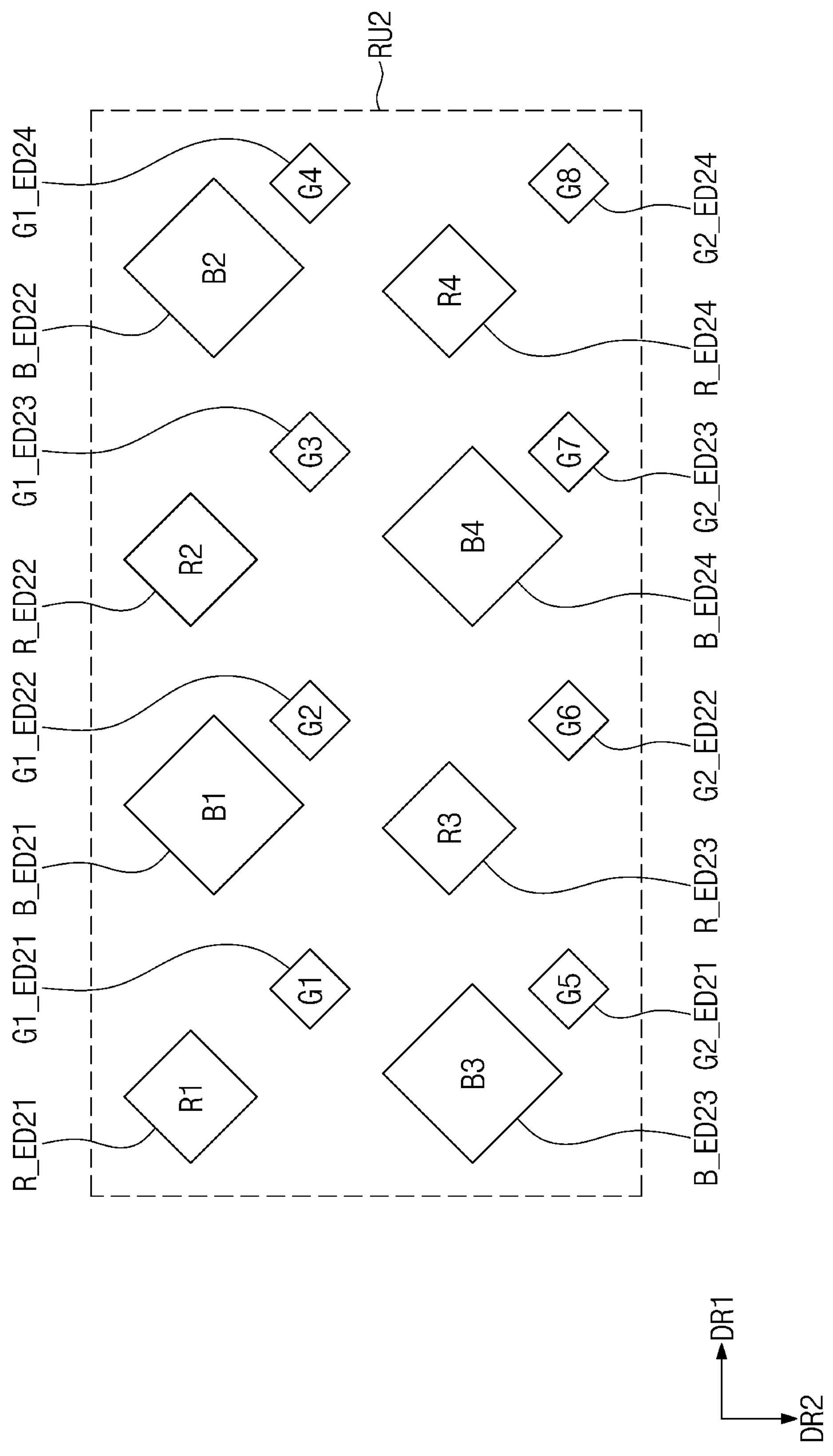
FIG. 11A is a view of image data input to correspond to a second reference unit according to an embodiment of the present disclosure.
Figure 11B:
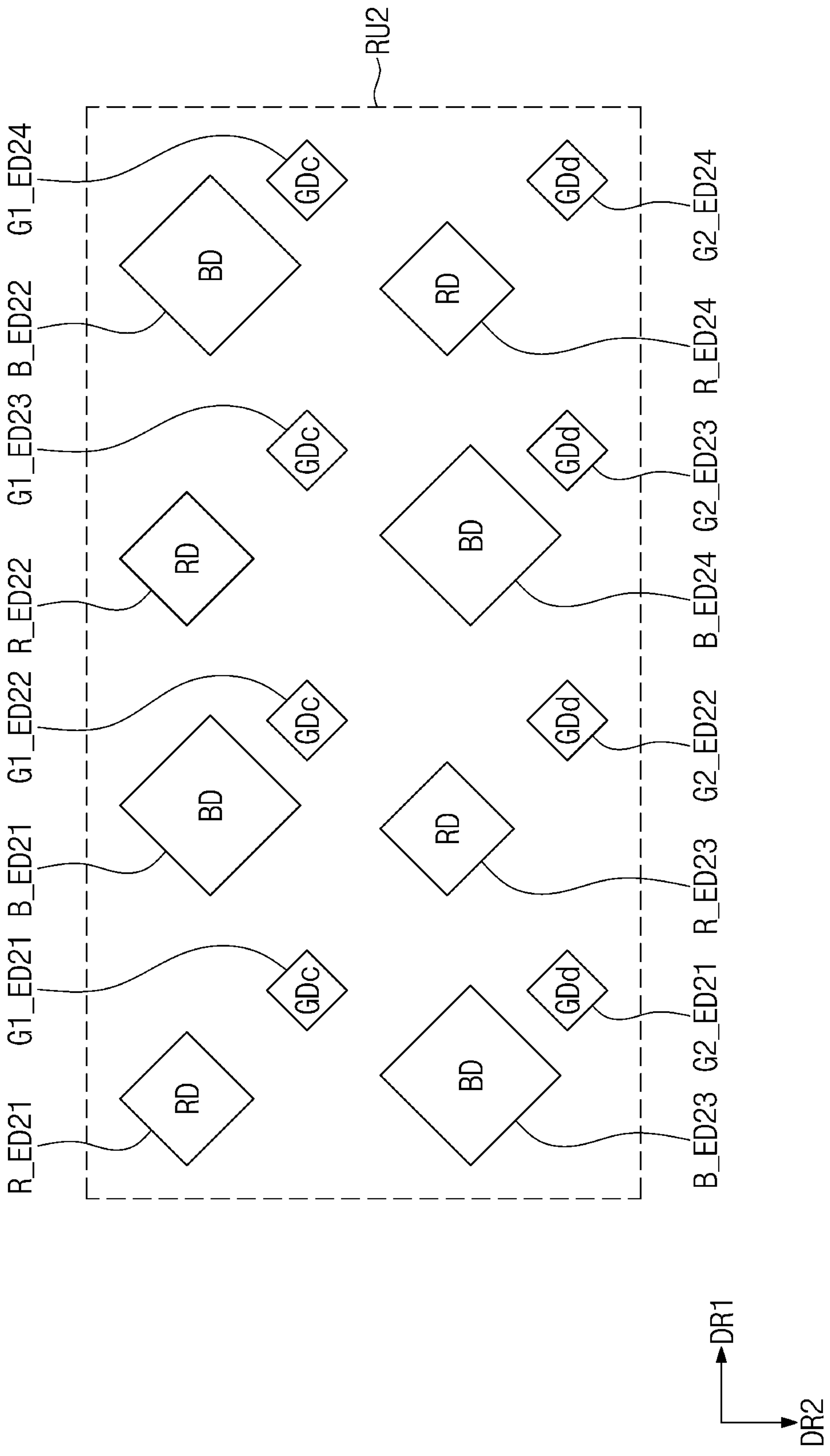
FIG. 11B is a view of a second reference unit driven by the rendering operation shown in FIG. 9.

FIG. 11A is a view of image data input to correspond to the second reference unit according to an embodiment of the present disclosure, and FIG. 11B is a view of a second reference unit driven by the rendering operation shown in FIG. 9.

Referring to FIGS. 9, 11A, and 11B, the data processing part 120*a* may include the red rendering part 120_R, the blue rendering part 120_B, and the green rendering part 120_Ga.

The first to eighth green image data G1 to G8 respectively corresponding to the eight green light emitting elements G1_ED21, G1_ED22, G1_ED23, G1_ED24, G2_ED21, G2_ED22, G2_ED23, and G2_ED24 included in the second reference unit RU2 may be provided to the green rendering part 120_Ga.

As an example, among the first to eighth green image data G1 to G8, the first to fourth green image data G1 to G4 may be green image data respectively corresponding to the four third green light emitting elements G1_ED21 to G1_ED24 arranged in a first row. Among the first to eighth green image data G1 to G8, the fifth to eighth green image data G5 to G8 may be green image data respectively corresponding to the four fourth green light emitting elements G2_ED21 to G2_ED24 arranged in a second row.

The third green driving circuit G1_PD2 commonly connected to the four third green light emitting elements G1_ED21 to G1_ED24 and the fourth green driving circuit G2_PD2 commonly connected to the four fourth green light emitting elements G2_ED21 to G2_ED24 may be disposed in the second reference unit RU2.

The green rendering part 120_Ga may generate first green compensation data GDc (e.g., first sub-compensation data) based on the first to fourth green image data G1 to G4 among the first to eighth green image data G1 to G8 and may generate second green compensation data GDd (e.g., second sub-compensation data) based on the fifth to eighth green image data G5 to G8 among the first to eighth green image data G1 to G8. A data signal corresponding to the first green compensation data GDc may be commonly applied to the four third green light emitting elements G_ED21 to G1_ED24, and a data signal corresponding to the second green compensation data GDd may be commonly applied to the four fourth green light emitting elements G2_ED21 to G2_ED24. For example, the upper row of green light emitting elements, e.g., G1_ED21 to G_ED24, may each receive the first green compensation data GDc and the lower row of green light emitting elements, e.g., G2_ED21 to G2_ED24, may each receive the second green compensation data GDd.

Accordingly, even though the specific pattern is displayed in the second display area DA2, all the third and fourth green light emitting elements G_ED21 to G1_ED24 and G2_ED21 to G2_ED24 included in the second reference unit RU2 may be operated, and as a result, the band of the specific color may be prevented from being formed at an upper or lower side of the specific pattern.

Although the embodiments of the present disclosure have been described, it is understood that the present disclosure should not be limited to these embodiments but various changes and modifications can be made by one ordinary skilled in the art. Therefore, the disclosed subject matter should not be limited to any single embodiment described herein.

What is claimed is:

1. A display device, comprising:
- a display panel comprising a first display area and a second display area adjacent to the first display area; and
- a panel driver receiving image data and controlling the display panel based on the image data, wherein a plurality of second reference units is disposed in the second display area, each of the second reference units comprises n first color light emitting elements and m second color light emitting elements, each of the n and the in is a natural number equal to or greater than 1, the m is greater than the n,
- the panel driver dividing the image data into first image data corresponding to the first display area and second image data corresponding to the second display area and determining whether an image displayed in the second display area comprises a first pattern based on the second image data,
- the panel driver rendering n first color image data corresponding to the n first color light emitting elements to generate first color compensation data and rendering m second color image data corresponding to the m second color light emitting elements using one of first and second methods selected according to whether the image displayed in the second display area comprises the first pattern to generate second color compensation data.

2. The display device of claim 1, wherein the n first color light emitting elements are connected to a first driving circuit, k second color light emitting elements among the m second color light emitting elements are connected to a first sub-driving circuit, j second color light emitting elements among the m second color light emitting elements are connected to a second sub-driving circuit, and each of the k and the j is a natural number equal to or greater than 1 and smaller than in.

3. The display device of claim 2, wherein the panel driver comprises:
- a first rendering part rendering k second color image data respectively corresponding to the k second color light emitting elements or rendering, j second color image data respectively corresponding to the j second color light emitting elements when the image displayed in the second display area does not comprise the first pattern; and
- a second rendering part rendering in second color data respectively corresponding to the in second color light emitting elements when the image displayed in the second display area comprises the first pattern.

4. The display device of claim 3, wherein the panel driver further comprises a first color rendering part that renders the n first color image data respectively corresponding to the n first color light emitting elements and generates the first color compensation data.

5. The display device of claim 4, wherein each of the second reference units further comprises n third color light emitting elements and a third driving circuit commonly connected to the n third color light emitting elements.

6. The display device of claim 5, wherein the first color light emitting elements emit a red light, the second color light emitting elements emit a green light, and the third color light emitting elements emit a blue light.

7. The display device of claim 4, wherein the panel driver further comprises a third color rendering part that renders n third color image data respectively corresponding to the r third color light emitting elements and generates third color compensation data.

8. The display device of claim 2, wherein each of the k and the j has a same value as m/2.

9. The display device of claim 8, wherein the m has a same value as 2n.

10. The display device of claim 1, wherein the panel driver comprises:
- a controller receiving the image data and converting the image data into image signals;
- a scan driver disposed in the second display area of the display panel and overlapping a portion of the first and second color light emitting elements; and
- a data driver converting the image signals to data signals and outputting the data signals to the display panel.

11. The display device of claim 1, wherein a plurality of first reference units is disposed in the first display area, each of the first reference units comprises p first color light emitting elements and q second color light emitting elements, each of the p and the q is a natural number equal to or greater than 1, and the q is greater than the p.

12. The display device of claim 11, wherein the p has a same value as the n, and the q has a same value as the m.

13. The display device of claim 12, wherein each of the first color light emitting elements included in each of the first reference units has a same shape and a same size as a shape and a size of each of the first color light emitting elements included in each of the second reference units, and each of the second color light emitting elements included in each of the first reference units has a same shape and a same size as a shape and a size of each of the second color light emitting elements included in each of the second reference units.

14. A display device, comprising:
- a display panel comprising a first display area and a second display area adjacent to the first display area; and
- a panel driver receiving image data and controlling the display panel based on the image data,
- wherein a plurality of reference units is disposed in the second display area, each of the reference units comprises n first color light emitting elements, a first driving circuit connected to the n first color light emitting elements by a first connection line, m second color light emitting elements, a first sub-driving circuit connected to k second color light emitting elements among the m second color light emitting elements by a second connection line, and a second sub-driving circuit connected to j second color light emitting elements among the m second color light emitting elements by a third connection line, each of the n and the m is a natural number greater than 1, the m is greater than the n, each of the k and the j is a natural number equal to or greater than 1 and smaller than the m, and
- the panel driver renders n first color image data corresponding to the n first color light emitting elements to generate first color compensation data for one among the n first color light emitting elements and renders m second color image data corresponding to the m second color light emitting elements to generate first sub-compensation data for a first one among the m second color light emitting elements and second sub-compensation data for a second one among the m second color light emitting elements, wherein the first driving circuit receives a first data signal corresponding to the first color compensation data through a first data line of the display panel to commonly provide the first data signal to the n first color light emitting elements through the first connection line, the first sub-driving circuit receives a first sub-data signal corresponding to the first sub-compensation data through a second data line of the display panel to commonly provide the first sub-data signal to the first one among the m second color light emitting elements through the second connection line, and the second sub-driving circuit receives a second sub-data signal corresponding to the second sub-compensation data through a third data line of the display panel to commonly provide the second sub-data signal to the second one among the m second color light emitting elements through the third connection line.

15. The display device of claim 14, wherein the panel driver comprises:

a first color rendering part rendering the n first color image data respectively corresponding to the n first color light emitting elements and generating the first color compensation data; and a second color rendering part rendering the m second color image data corresponding to the m color light emitting elements and generating the first sub-compensation data and the second sub-compensation data.

16. The display device of claim 15, wherein each of the k and the j has a same value as m/2, and the in has a same value as 2n.

17. The display device of claim 15, wherein each of the reference units further comprises n third color light emitting elements and a third driving circuit commonly connected to the n third color light emitting elements, and the panel driver further comprises a third color rendering part that renders n third color image data respectively corresponding to the n third color light emitting elements and generates third color compensation data.

18. The display device of claim 17, wherein the first color light emitting elements emit a red light, the second color light emitting elements emit a green light, and the third color light emitting elements emit a blue light.

* * * * *